United States Patent [19]

Akagi et al.

[11] Patent Number: 5,557,486
[45] Date of Patent: Sep. 17, 1996

[54] THIN EXTERNAL MEMORY UNIT WITH HARD DISK

[75] Inventors: Kyo Akagi, Fuchu; Yasuhiro Kato, Tokyo; Masaaki Matsumoto; Akira Iida, both of Odawara, all of Japan; Yong-kweon Kim, Seoul, Rep. of Korea

[73] Assignee: Hitachi, Ltd., Tokyo, Japan

[21] Appl. No.: 160,660

[22] Filed: Dec. 2, 1993

[51] Int. Cl.⁶ ........................................ G11B 5/012
[52] U.S. Cl. ........................ 360/97.01; 360/97.02
[58] Field of Search ...................... 360/97.01, 97.02

[56] References Cited

U.S. PATENT DOCUMENTS

| | | | |
|---|---|---|---|
| 4,959,579 | 9/1990 | Kuwabari et al. | 310/323 |
| 5,025,336 | 6/1991 | Morehouse et al. | 360/97.02 |
| 5,172,023 | 12/1992 | Kawai et al. | 310/323 |
| 5,264,975 | 11/1993 | Bajorek et al. | 360/97.01 |
| 5,329,412 | 7/1994 | Stefansky | 360/97.01 |

*Primary Examiner*—John H. Wolff
*Attorney, Agent, or Firm*—Antonelli, Terry, Stout & Kraus

[57] ABSTRACT

A disk unit has a recording medium disk; a head for reading and writing information on said disk; a first actuator for moving said head relative to said disk, said first actuator having no bearing structure; a second actuator for rotating said disk, said second actuator having no bearing structure; and a housing for housing said disk, said head, said first actuator and said second actuator.

73 Claims, 23 Drawing Sheets

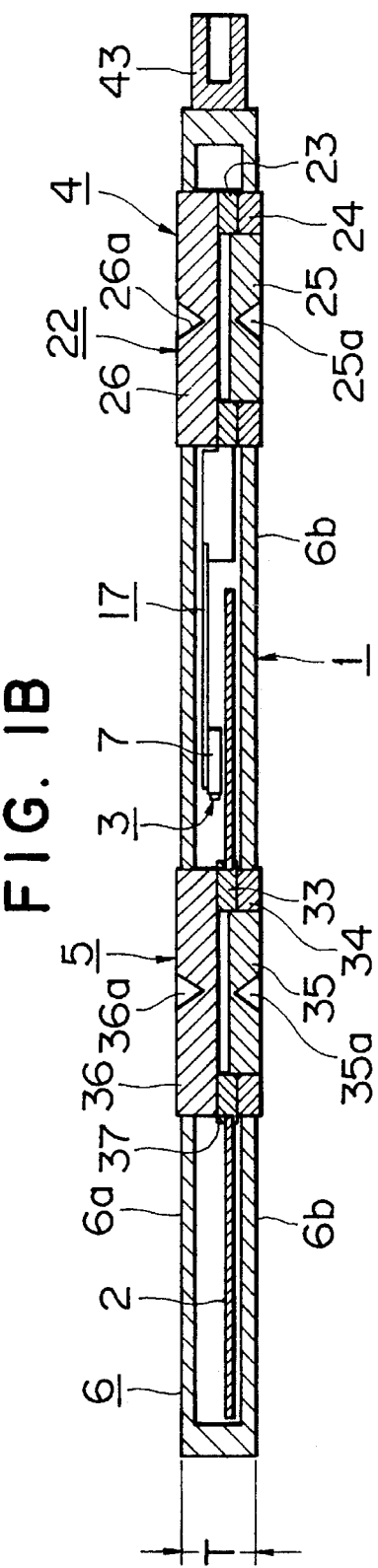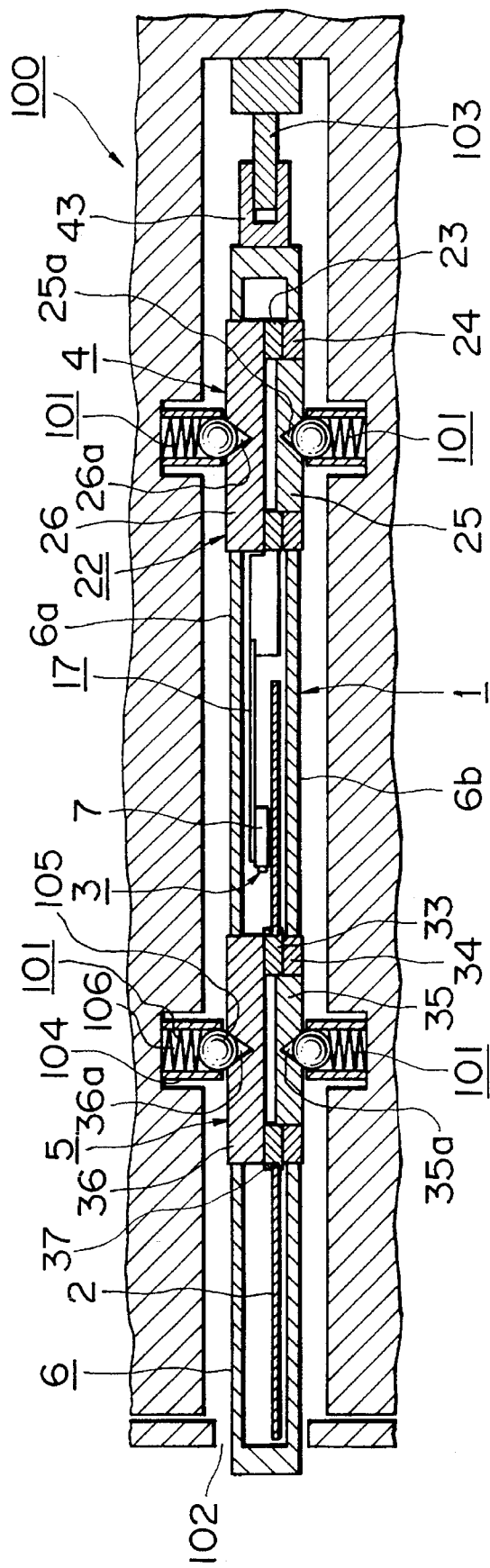

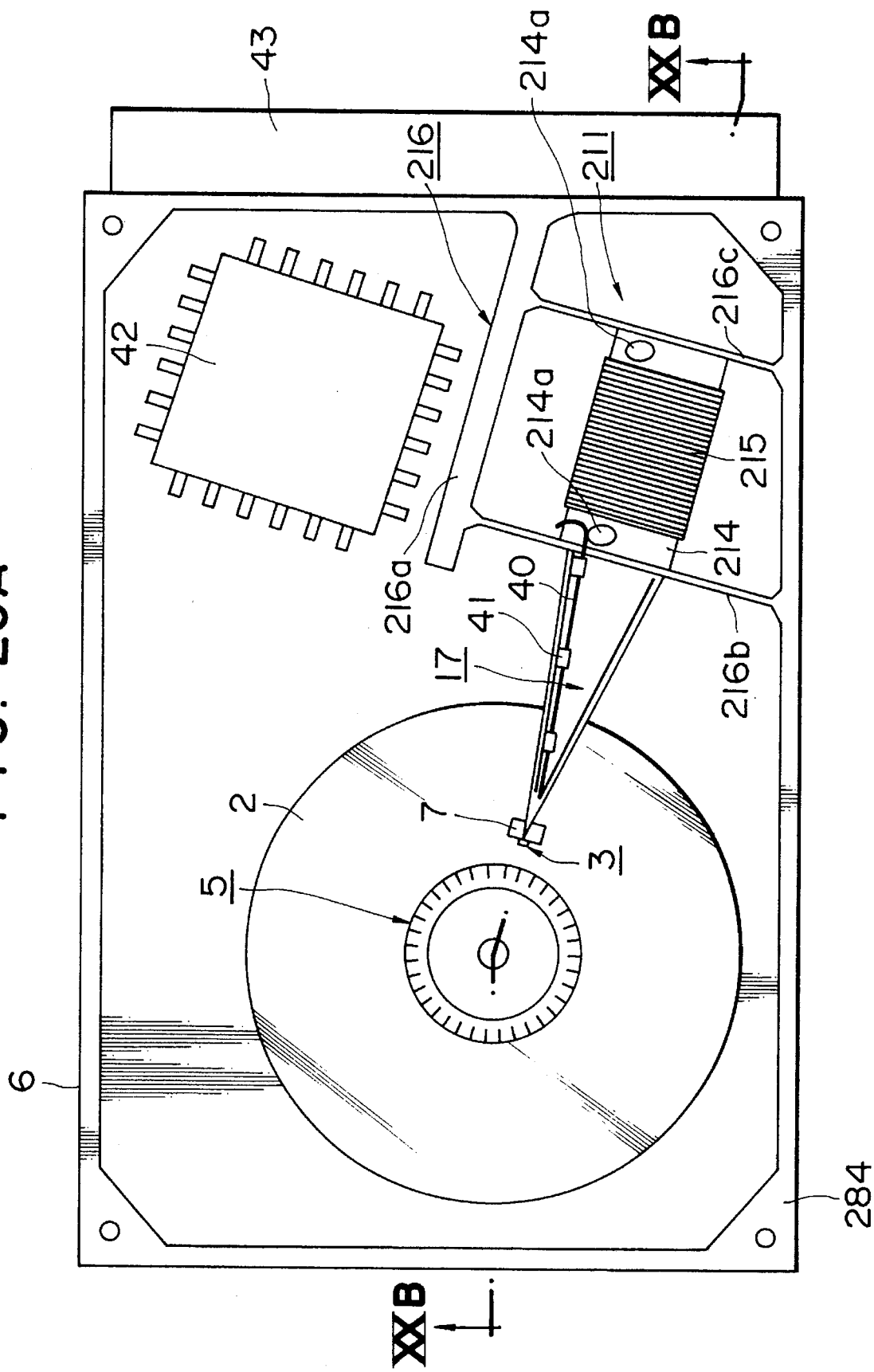

5,557,486

THIN EXTERNAL MEMORY UNIT WITH HARD DISK

BACKGROUND OF THE INVENTION

This invention relates to a disk drive device used as an external memory unit of a computer system or the like.

There are various kinds of memory media of external memories or external memory units. Among the magnetic memories are floppy disks, hard disks (HDDs), and magnetic cards, and among optical memories are optical disks, magneto-optic disks and optical cards. In the category of semiconductor memories are semiconductor disks, IC cards, and IC memory cards. All those memory devices have no compatibility among them.

On the other hand, in the personal computers which are moving towards progressively lighter weight, there have been requirements for memory media with smaller size and larger capacity.

In the conventional technology, the kind of medium is selected according to the purpose of use, that is, where portability and replaceability are important, floppy disks, optical disks, and IC cards are selected, and where a large capacity is required, hard disks and optical disks are selected, and where small size and light weight are essential, IC cards are selected. However, if advantages of small size as small as the so-called card size and a large capacity are sought, the conventional external memories do not necessarily meet those requirements.

SUMMARY OF THE INVENTION

The items required of the memory media are large capacity, high speed, low bit cost, small size, portability, the ease with which to provide application programs, and high reliability. With regard to those items, the hard disk is superior to IC cards in memory capacity and bit cost (cost per bit) and also superior to floppy disks and optical memory media in high speed. Therefore, the hard disk, if it can be reduced in size and weight, will become the most desirable memory medium. The greatest challenge in the development of the disk units, including the hard disk unit is the reduction of size, particularly to reduce the size down to a card size.

The present invention has as its object to provide an external memory unit which is small and superior in portability and on which a large quantity of data can be recorded and reproduced.

In order to achieve the above object, the disk unit according to an aspect of the present invention comprises a recording medium disk; a head for reading and writing information on the disk; a first actuator portion for moving the head portion relative to the disk, said first actuator portion having no bearing structure; a second actuator portion for rotating the disk, said second actuator portion having no bearing structure; and a housing portion for housing the disk, the head portion, the first actuator portion and the second actuator portion.

It has conventionally been considered that in the disk unit, a bearing structure using a bearing or the like should naturally be adopted in the actuator portion for moving the head portion relative to the hard disk and in the actuator portion for rotating the recording medium disk. However, as a result of study by the present inventor, it has been found that the bearing structure is an obstacle in down-sizing the whole unit. The disk unit according to an aspect of the present invention has been created based on such a finding.

In this disk unit, as the first and the second actuator portions, those which have no bearing structure are adopted, which contributes to reducing the thickness of the whole disk unit, so that the size of the disk unit can be reduced. In the disk unit, by adopting, for example, a hard disk or the like as the recording medium disk, the memory capacity can be increased.

According to another aspect of the present invention, the disk unit comprises a recording medium disk; a head portion for reading and writing information on the disk; a first driven portion, adapted to be operatively connected to a first driving portion, for moving the head portion relative to the disk by being driven by the first driving portion when connected to the first driving portion; a second driven portion, adapted to be operatively connected to a second driving portion by being driven by the second driving portion, for rotating the disk by being driven by the second driving portion when connected to the second driving portion; and a housing portion for housing the disk, the head portion, the first driven portion, and the second driven portion. The first and second driving portions are provided outside the housing portion.

It has also conventionally been considered that in the disk unit, there should naturally be provided a driving portion for generating a motive power to move the head portion relative to the hard disk, and a driving portion for generating a motive power to rotate the recording medium disk. In study by the present inventor, it has been found that those driving portions are obstacles in down-sizing the whole disk unit. And, the present inventor hit upon an idea that by relocating the driving portions to the side of the drive device for causing the disk unit to operate to read and write information on the disk, the disk unit itself can be reduced in size, and no inconvenience in use results. The disk unit according to the above-mentioned other aspect of the present invention has been born based on such an idea. According to the disk unit, since the above-mentioned first and second driving portions are provided, the thickness of the whole disk unit can be reduced, so that the size reduction of the disk unit can be realized. In the disk unit, as the recording medium disk, if a hard disk, for example, is adopted, the memory capacity can be increased.

BRIEF DESCRIPTION OF THE DRAWINGS

FIG. 1B is a sectional view taken along a line 1B—1B;

FIG. 1C is a sectional view showing a condition that the disk unit shown in FIG. 1A is mounted on the drive device;

FIG. 20A is a plan view of the disk unit according to the still further embodiment of the present invention showing the condition that the upper surface portion of the housing portion has been removed;

DESCRIPTION OF THE PREFERRED EMBODIMENTS

The disk unit according to the present invention will be described with reference to the accompanying drawings.

A disk unit 1 according to an embodiment of the present invention will first be described referring to FIGS. 1A to 3.

Figure 1A:
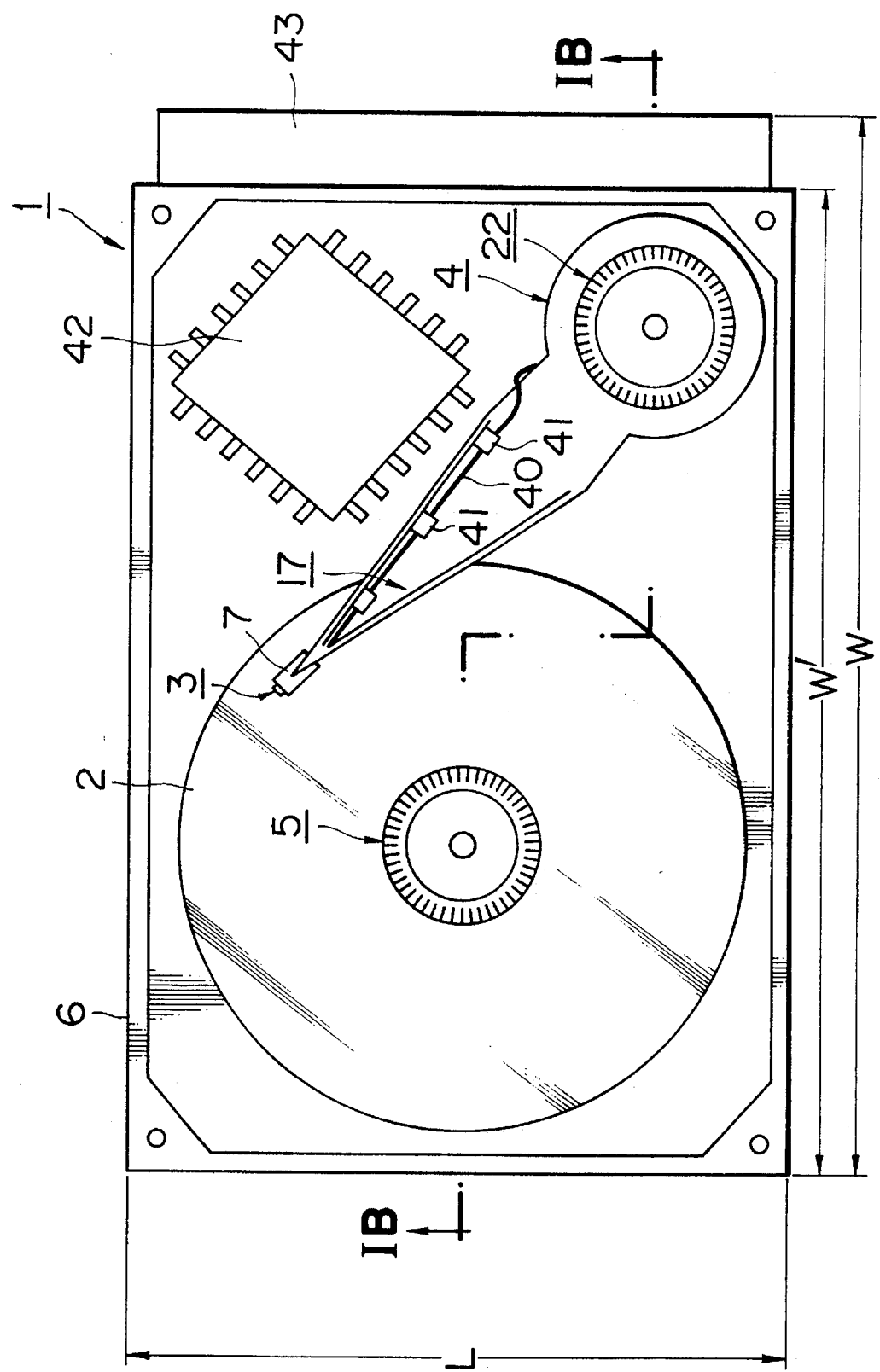
FIG. 1A is a plan view of the disk unit according to an embodiment of the present invention and shows a condition of the disk unit with the top surface portion of the housing portion removed.
Figure 1D:
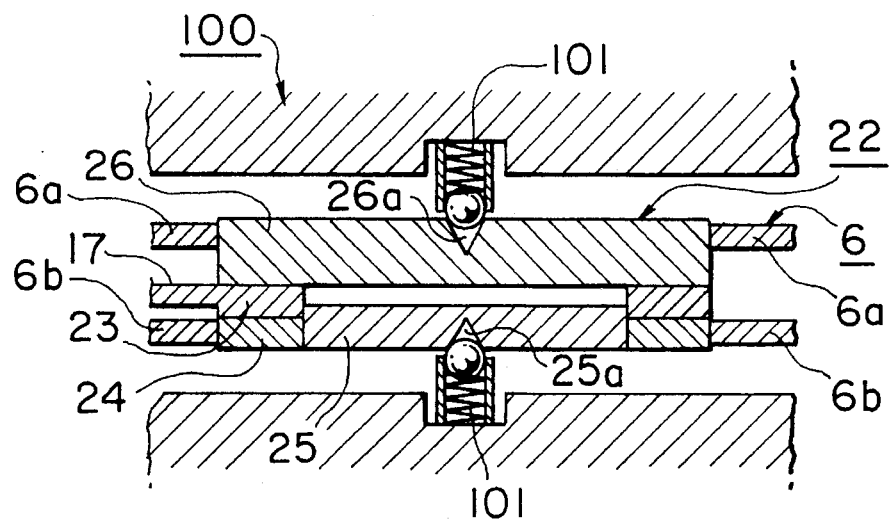
FIG. 1D is an enlarged view of a part of FIG. 1C.
Figure 1E:
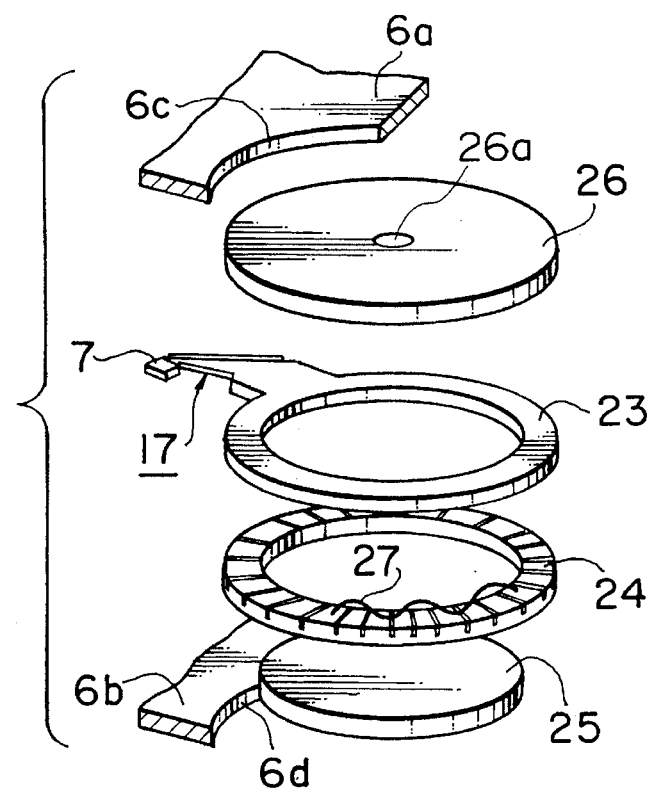
FIG. 1E is an exploded view in perspective of the construction shown in FIG. 1D.
Figure 1F:
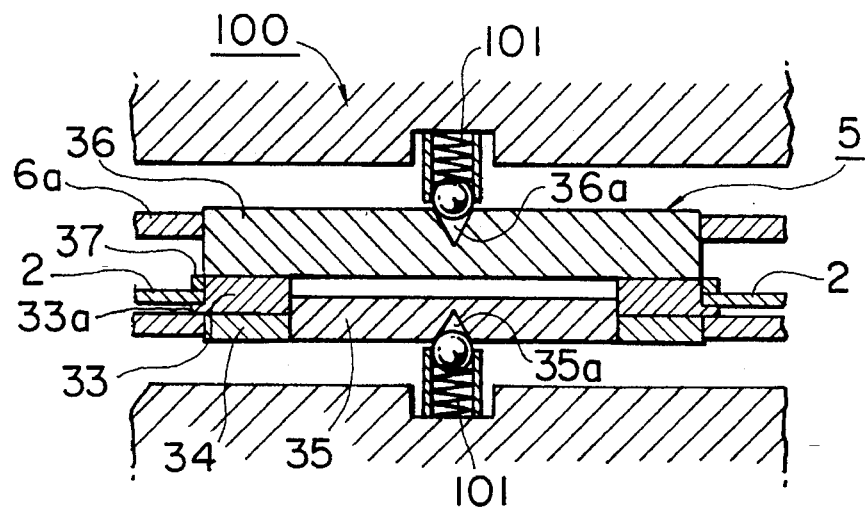
FIG. 1F is an enlarged view of another part of FIG. 1C.
Figure 1G:
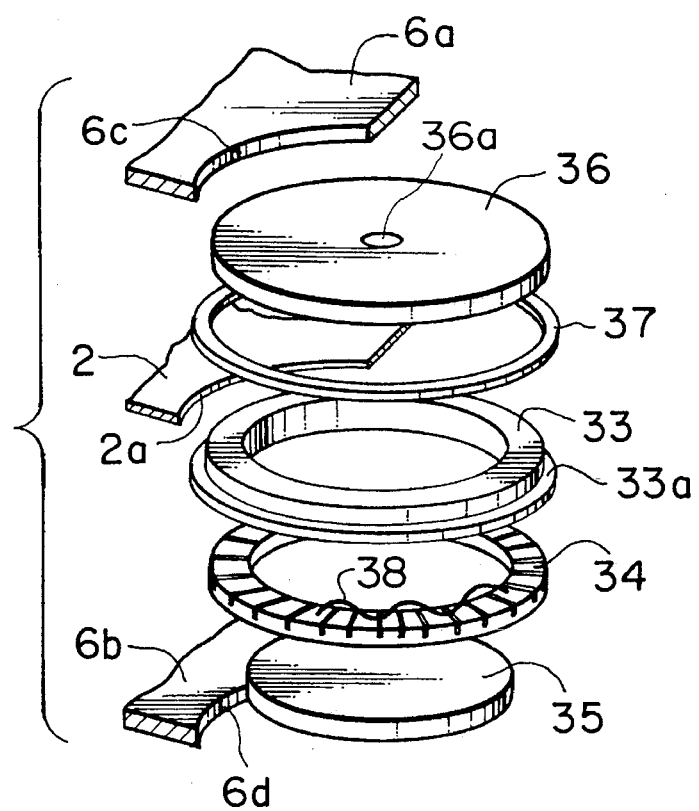
FIG. 1G is an exploded view in perspective of the construction shown in FIG. 1F.
Figure 2:
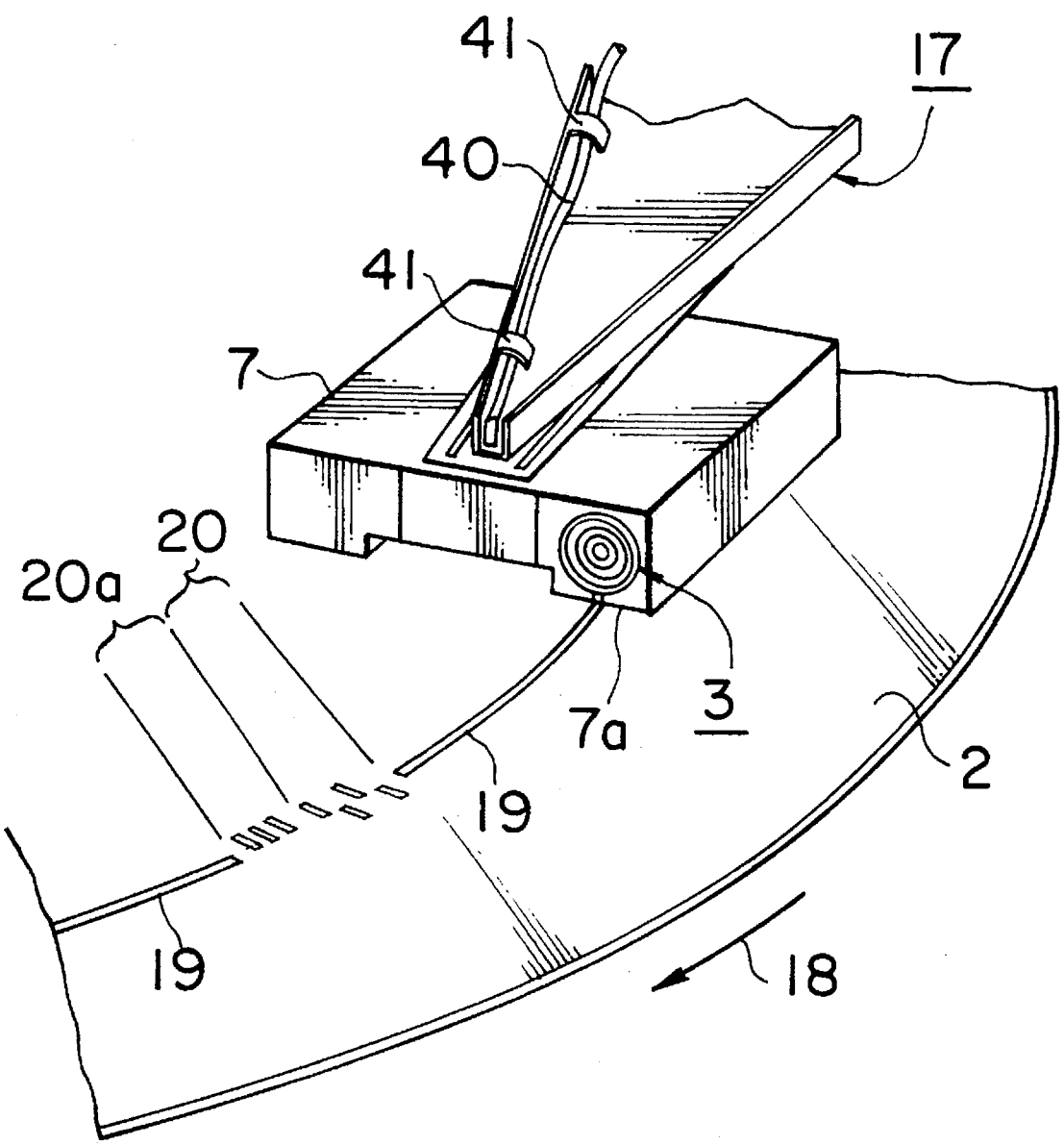
FIG. 2 is a perspective view of the head portion and the disk used in the disk unit shown in FIG. 1A.
Figure 3:
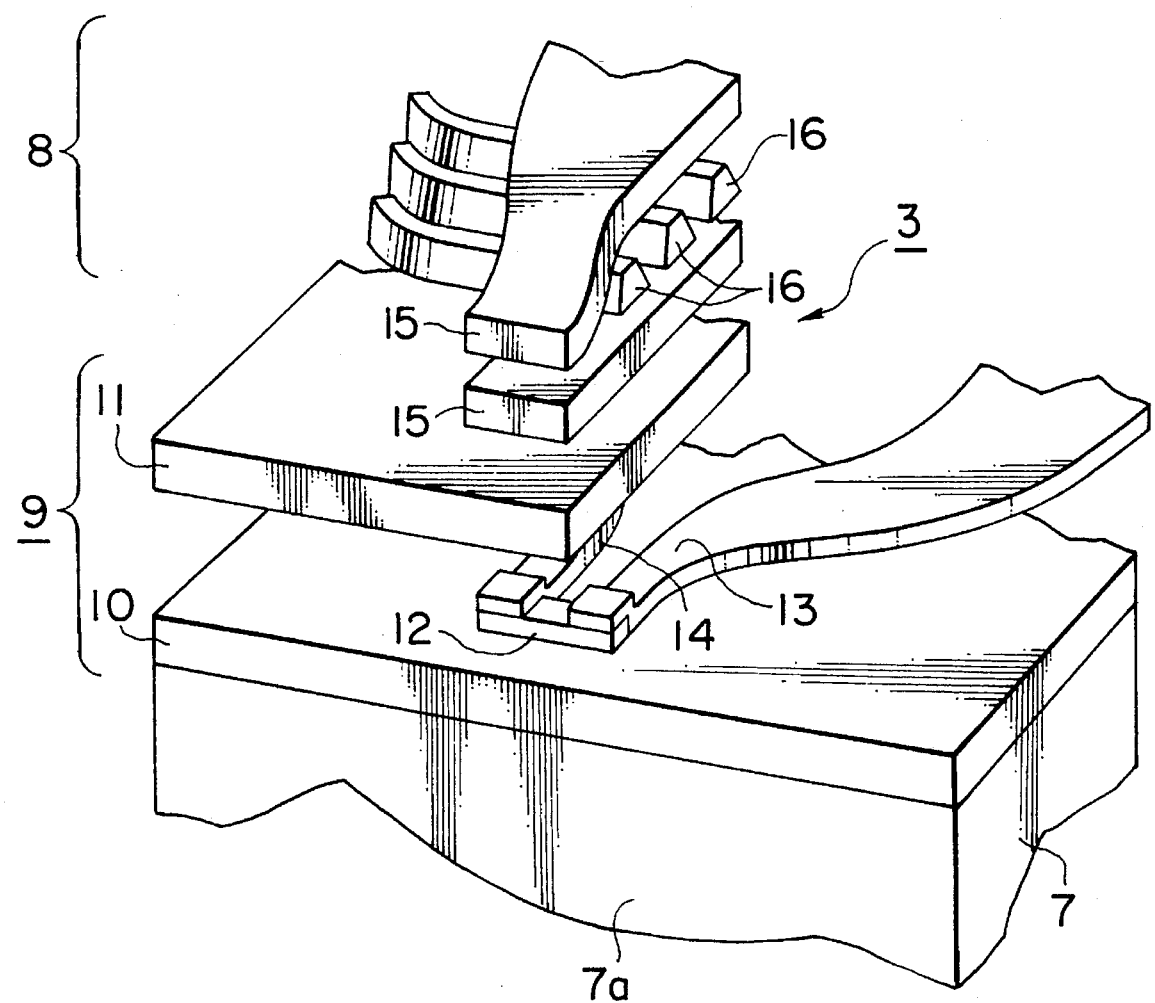
FIG. 3 is an enlarged view in perspective of a recording-reproduction-separated type head used in the head portion in FIG. 1.

FIG. 1A is a plan view of the disk unit 1 showing the condition that the upper surface portion 6a of a housing portion 6 has been removed. FIG. 1B is a diagram showing a sectional view taken along line 1B—1B in FIG. 1A. FIG. 1C is a sectional view that shows condition that the disk unit 1 is mounted on a drive device 100, and corresponds to FIG. 1B. FIG. 1D is an enlarged view of a part of FIG. 1C. FIG. 1E is an exploded view in perspective of the construction shown in FIG. 1D. FIG. 1F is an enlarged view of another part of FIG. 1C. FIG. 1G is an exploded view in perspective of the construction shown in FIG. 1F. FIG. 2 is a perspective view showing the head portion 3 and the disk 2 used in the disk unit shown in FIG. 1A. FIG. 3 is an enlarged perspective view showing the recording-reproduction-separated type head used in the head portion 3 shown in FIG. 2.

As shown in those figures, the disk unit 1 comprises a recording medium disk 2; a head portion 3 for reading and writing information on the disk 2; a first actuator portion 4 for moving the head portion relative to the disk 2, said first actuator portion 4 having a stator and a rotor without a bearing structure therebetween; a second actuator portion 5 for rotating the disk 1, said second actuator portion 5 having a stator and a rotor without a bearing structure therebetween; a housing portion 6 containing the disk 2, the head portion 3, the first actuator portion 4, and the second actuator portion 5.

In this embodiment, as the disk, a magnetic disk, such as a hard disk, is used. Though not shown in the figures, a magnetic film for vertical magnetic recording is provided on the disk 2. The provision of this type of magnetic film offers an advantage of high recording density, but the magnetic film need not necessarily be one on which vertical magnetic recording can be performed. In addition, as the disk 2, other types of recording medium disk, such as an optical disk and a magneto-optic disk, may be adopted. The diameter of the disk 2 is preferably 51 mm. More preferably, the diameter of the disk 2 is about 1.8 inches, about 1.3 inches, about 1.0 inch or about 0.7 inch.

In this embodiment, since a magnetic disk is adopted for the disk 2, a magnetic head is adopted for the head portion 3. As shown in FIGS. 2 and 3, as the head portion 3, a recording-reproduction-separated head, comprising a recording portion 8 for writing information on the disk 2 and a reproducing portion 9 for reading information from the disk 2, is adopted. In this embodiment, as the recording portion 8, an induction type head is used, while as the reproducing portion 9, a magneto-resistive-effect type head is used. The reproducing portion 9 includes shields 10 and 11, a spacer 12, and electrodes 13 and 14, and the recording portion 8 includes a core 15 and a coil 16. For example, the reproducing portion 9 and the recording portion 8 are formed in that order on the side face of the slider 7 by a thin-film forming process. The reproducing portion 8 and the recording portion 8 are formed in such a way that the width of a track on which data is recorded by the recording portion 8 and the width of a track from which data is read by the reproducing portion is about 1 μm each. The principle of recording and reproduction of the head portion 3 thus constructed is the same as that of the conventional method of magnetic recording and reproduction. Like in this embodiment, when a recording-reproduction-separated type head is adopted for the head portion 3, this is advantageous in increasing the recording density.

As shown in FIG. 2, the slider 7 is attached to the distal end of the arm portion 17 which will be described later. The slider 7 floats keeping a gap of, for example, 0.1 μm or less from the surface of the disk 2 by a balance between the plate spring action of the arm portion 17 and a layer of air, which is produced between the upper surface of the disk 2 and the slider surface (facing the disk 2) of the slider 7 by the high-speed rotation of the disk 2 in the direction of the arrow 18 in FIG. 3. FIG. 2 shows a track 19 on the disk 2 on which information is recorded or reproduced with the head portion 3 under the condition described above.

In this embodiment, as shown in FIG. 2, servo patterns 20 for detection and control of the position of the head portion 3 relative to the disk 2 and other patterns 20a representing control information, such as ID, are formed on the disk 2 in advance as changes of shape or changes of the magnetic characteristics, but not by magnetic recording. Patterns 20 and 20a constitute a servo sector. The patterns 20 and 20a can be preformatted by a technique, such as lithography and etching, for example, and therefore, the increase in accuracy of writing positioning information can be facilitated and high density can be achieved.

Description will be made of a method of producing a disk 2 which is pre-formatted by pre-embossing the patterns 20 and 20a. As a disk material, a resin such as a plastic, glass, metal and the like is used, and by using a bossed pattern die corresponding to the preformat prepared in advance, the patterns 20 and 20a are formed on the disk material. By this method, the patterns 20 and 20a can be formed easily. By forming a magnetic film on the disk material which has had the patterns 20 and 20a already formed, the disk 2 can be obtained. In the process of forming a magnetic film, the disk material cannot be overheated above the melting point of the resin. In order to obtain the magnetic recording characteristics for high density recording in a low-temperature film forming process, it is desirable to form a vertical recording film of Co—O or the like as the magnetic film. If glass or metal substrate are used, a conventional servo writing method can be also used.

Figure 4:
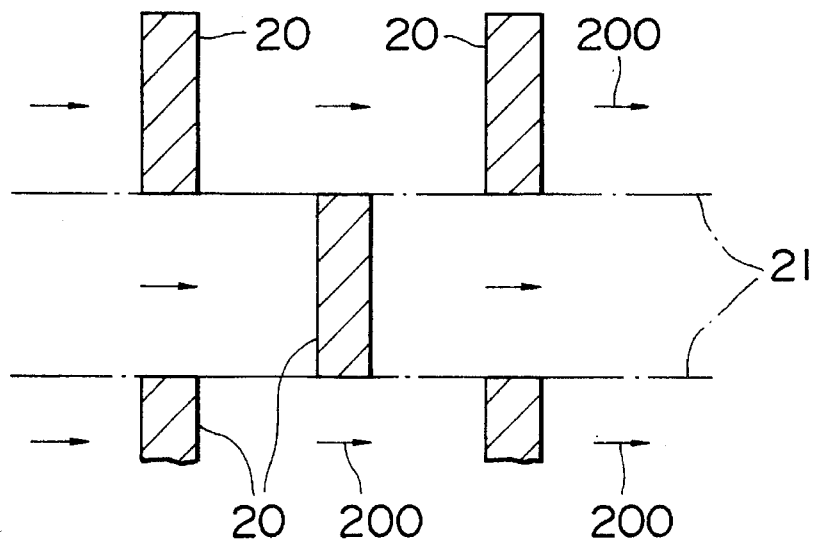
FIG. 4 is a diagram showing an example of the servo pattern on the disk.

FIG. 4 shows an example in which the servo patterns 20 are pre-embossed as described above. In this example, as the patterns 20, pits are adopted, and the pits are arranged such that the pits in a given row are staggered with respect to the pits in adjacent rows with the side ends of the pits lying along the track centers 21. The surrounding area of the patterns 20 are magnetized in one direction indicated by the arrows 200. Or, a pulse signal of a fixed frequency may be recorded. By this arrangement, the patterns 20 can be read with the reproducing portion 9 of the head portion 3. In this case, the reproducing portion 9 can be used to serve as a detector to read the servo patterns 20. Note that by finding differences of the pit signals on both sides of the centers 21 of the tracks, the displacement of the head portion 3 can be known.

Figure 5:
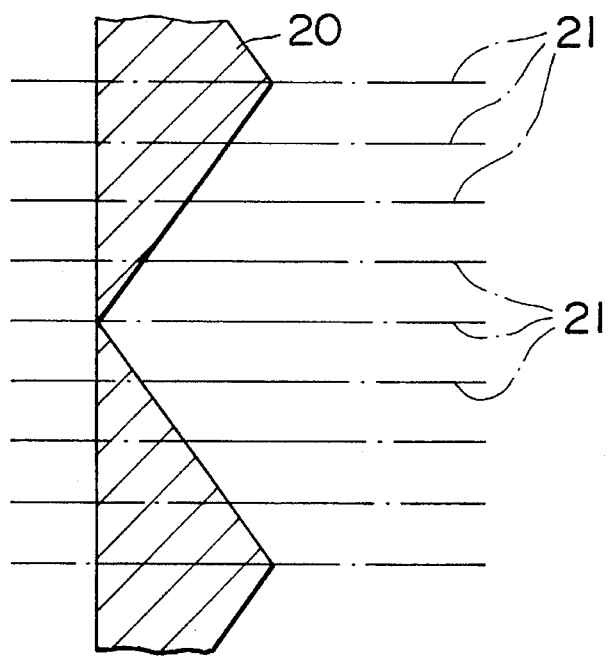
FIG. 5 is a diagram showing another example of the servo pattern on the disk.

FIG. 5 shows another example of the servo patterns 20 pre-embossed. In this example, as the patterns 20, the pits are adopted which form an edge extending obliquely with respect to the track centers 21. In this example, by recording a pulse signals of a fixed frequency around the patterns 20, the reproducing portion 9 of the head portion 3 can read the patterns 20. Or, the surrounding areas of the patterns may be magnetized in one direction. In this case, too, the reproducing portion 9 can be used as a detector to read the servo patterns. In this example, by utilizing the fact that the time when the head portion 3 passes the pattern 20 varies with its position, the displacement of the head portion 8 can be known.

Further, in this embodiment, the first actuator portion 4 includes a motor 22, the arm portion 17 which is connected at one end to the moving portion constituting the motor portion 22, and slider 7 provided at the other end of the arm portion 17, and therefore, the first actuator portion 4 causes the head portion 3 to swing.

In this embodiment, the motor portion 22 is formed as an annular type ultrasonic motor. The motor portion 22 includes an annular rotor 23 as a moving portion, an annular stator 24, a disc-shaped support plate 25, and a disc-shaped retainer 26 as shown in FIGS. 1D and 1E. The external circumference of the stator 24 is fixed to the internal circumference of a hole 6d provided at the lower surface portion 6b of the housing portion 6. On the upper surface of the stator 24, there are provided in the circumferential direction a plurality of piezoelectric elements which expand and contract in the through-thickness direction of the annular body, so that a progressive wave is produced which turns around along the center position of the annular upper surface of the stator 24 as shown in FIG. 1E. The support plate 25 is fitted in and fixed to the stator 24. The support plate 25 is thicker than the thickness of the stator 24, and therefore, the upper portion of the support plate 25 protrudes from the stator 24. The rotor 23 is mounted on the upper surface of the stator 24, is fitted on the upper portion of the external circumference of the support plate 25, and is pushed from above by the retainer 26. By this arrangement, the rotor 23 is rotatably supported and is rotated by the progressive wave 27. The external circumference of the retainer 26 is fixed to the internal circumference of a hole 6c provided at the upper surface portion 6a of the housing portion 6. The retainer 26 may be formed integrally with the housing portion 6. In the lower surface of the support plate 25 and in the upper surface of the retainer, there are provided recessed portions 25a, 26a each fit in with a support mechanism 101 which will be described later. In this embodiment, since the recessed portions 25a, 26a are located at a position corresponding to the rotation center of the rotor, the vibrations produced by rotation of the rotor 23 are damped out effectively by the support mechanisms 101, which is an advantage. However, the positions of the recessed portions are not limited to the positions which have been described, but may be provided at suitable positions of the upper surface portion 6a and the lower surface portion 6b of the housing portion 6.

In this embodiment, the construction of the arm portion 17 is substantially the same as in the disk drive unit disclosed in U.S. Pat. No. 4,167,765, and therefore, its description is omitted. The disclosure of U.S. Pat. No. 4,167,765 is hereby incorporated by reference. However, in this embodiment, the arm portion 17 is at one end connected integrally with the rotor 23, and therefore, one of the advantages is the ease of manufacture. In FIGS. 1A and 2, reference numeral 40 denotes a tube for accommodating lead wires for electrical wiring to the head portion 3, and 41 denotes a fastener for fixing the tube 40 to the arm portion 17.

Further, in this embodiment, the second actuator portion 5 is formed as an annular type ultrasonic motor like in the motor portion 22 of the first actuator portion 4. As shown in FIGS. 1F and 1G, the second actuator portion 5 includes an annular rotor 33 as a moving portion, an annular stator 34, a disc-shaped support plate 35, a disc-shaped retainer 36, and an annular retainer member 37. The rotor 33, the stator 34, the support plate 35, and the retainer 36 correspond to the rotor 23, the stator 24, the support plate 25, and the retainer 26, and therefore, their concrete descriptions are omitted. However, in the case of the second actuator 5, the rotor 33 has a flange 33a along the external circumference thereof, and the rotor 33 is fitted into a hole 2a provided in the center of the disk 2, and the disk 2 is placed and fixed between the flange 33a and the retainer member 37. In FIGS. 1F and 1G, reference numeral 38 denotes a progressive wave produced by the stator 34, and 35a and 36a denote recessed portions corresponding to the recessed portions 25a and 26a in FIG. 1D.

Further, in this embodiment, as shown in FIG. 1A, a circuit 42 for drive control of the first and second actuator portions 4, 5, write/read control of record data, data processing and input/output control of data is also contained in the housing portion 6. This circuit 42 is formed as an IC, and though not shown in the figures, electrical connection between this circuit 42, and the head portion 3 and the first and second actuator portions 4 and 5 is done by lead wires, a flexible printed circuit board, a printed circuit board, or the like. All or a part of the circuit 42 can be provided in the position shown in FIG. 1A.

The first and second actuators 4, 5 are formed as described, so they have no bearing structure, and therefore, the whole bodies of the first and second actuator portions 4, 5 can be reduced in thickness. The thickness of the first and second actuator portions 4, 5 are preferably no greater than 5.5 mm, and more preferably no greater than 3.5 mm.

Further in this embodiment, as shown in FIGS. 1A to 1C, the housing portion 6 is box-shaped, and has on its side an interface connector portion 43 provided which transmits signals and information to and from outside. In this embodiment, the interface connector portion 43 is electrically connected to the circuit 42. The interface connector portion 43 is preferably formed so as to comply with PCMCIA's IC memory card standards. Needless to say, the interface connector portion 43 need not necessarily be provided on the side face of the housing portion 6, nor is it required to be formed so as to comply with the above-mentioned IC memory card standards. For example, the interface connector portion 43 may be so formed as not to protrude from the housing portion 6.

As has been described, in the disk unit 1, the first and second actuator portions 4 and 5 have no bearing structure, so that the thickness of the whole disk unit 1 can be reduced, and that the size of the disk unit 1 can be decreased. For example, the length L of the disk unit 1 can be made no greater than 55 mm, the width W no greater than 86 mm, the thickness T no greater than 5.5 mm. When it is desired to maintain compatibility with the conventional IC memory cards, in order to comply with PCMCIA's IC memory standards, preferably, the length L of the disk unit 1 should be 85.6±0.1 mm, the width W 54.0±0.1 mm, and the thickness T 3.3±0.2 mm or no greater than 5 mm. If the interface connector portion 43 is formed so as not to protrude from the housing portion 6, the width W' should preferably be no greater than 86 mm.

When information is read from and written on the disk unit 1, as shown in FIG. 1C, the disk unit is loaded into the drive device 100 which actuates the disk unit 1 to make it read and write information on the disk 2. The drive device 100 includes the support mechanisms 101, a slot 102, and an interface connector portion 103 which fits into the interface connector portion 43. For example, the drive device 100 constitutes a part of a computer system, and the CPU of the computer system transmits data and control signals to and from the disk unit 1 through the interface connector portion 103. Loading the disk unit 1 into the drive device 100 is done by inserting the disk unit 1 through the slot 102. By so doing, the interface connector portion 43 fits in with the interface connector portion 103, and is Supported by the support mechanisms 101. Each said support mechanism 101 includes a cylindrical member 104, a ball member 105, and a spring which urges the ball member 105 into the protruding state from the cylindrical member. Though detail is not illustrated, each said cylindrical member 104 has a stopper of the ball member 105 provided at the extreme end thereof. When the disk unit 1 is loaded in the drive device 100, by a control signal from the CPU, the loaded disk unit 1 is recognized, rotation control of the disk 2 is performed, and read/write control is executed, so that data can be recorded on the disk 2 or reproduced (read) from the disk 2.

The drive device 100 can be used also as the drive device for IC cards. When not an IC card but the disk unit 1 is inserted into the drive device 100, the above-mentioned CPU recognizes that what has been inserted is the disk unit 1, and the disk unit 1 can be handled in the same way as IC cards in an FAT file system (a file system using a file allocation table). In other words, when an IC card and the disk unit 1 are looked on as memories from the CPU side, those two kinds of memories can be recognized as virtually the same memory media except for differences in performance.

Description has been made of the disk unit 1 according to the embodiment of the present invention shown in FIGS. 1A to 3.

Description will now be made of other modifications of the present invention by modifying the above-mentioned embodiment.

Figure 6:
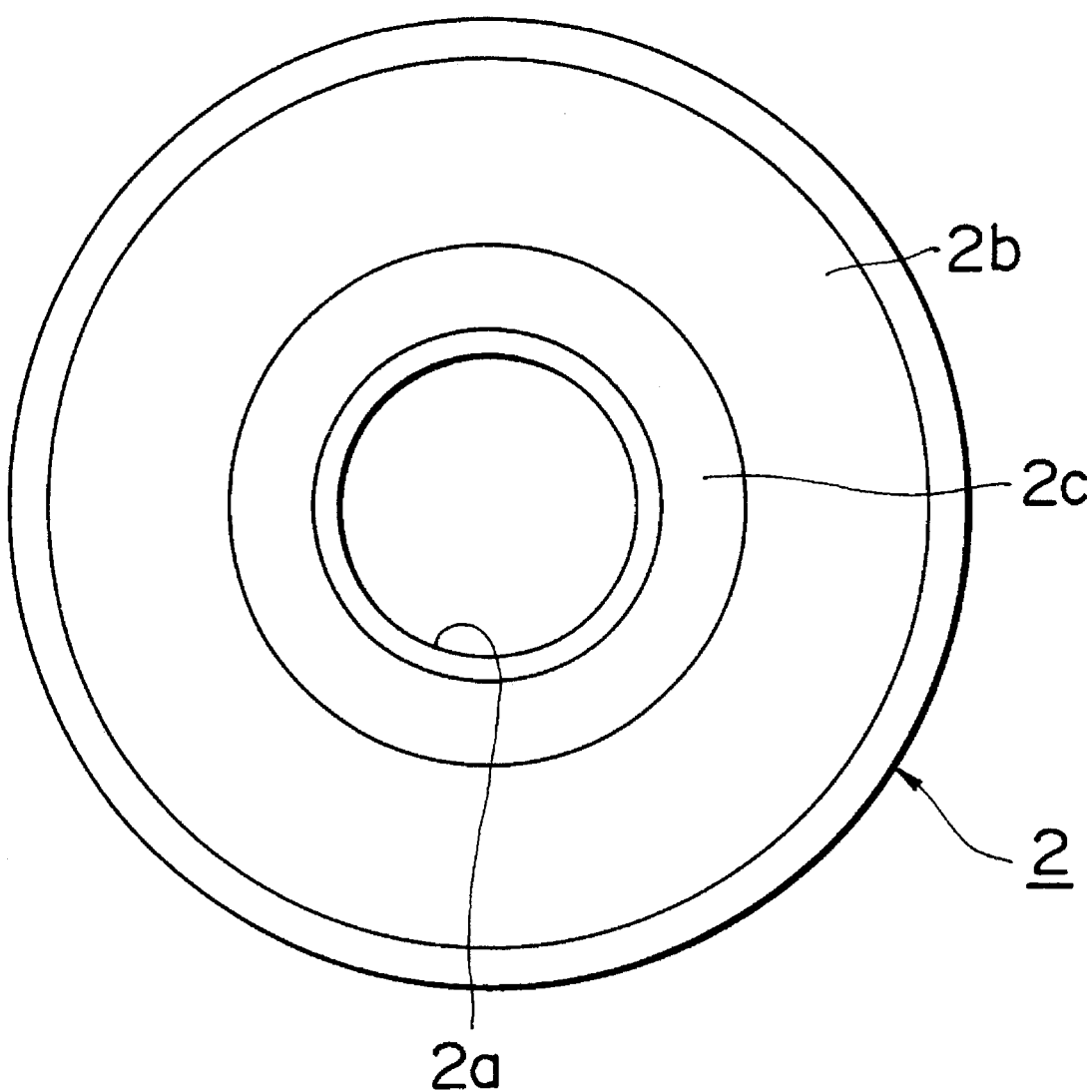
FIG. 6 is a plan view showing an example of the disk.

As a first modification, the disk 2 may have a ROM area 2c where the head portion 3 can only read information in addition to a RAM area 2b where the head portion 3 can read and write information as shown in FIG. 6. Even if the disk 2 has only the RAM area 2b but does not have the ROM area 2c, because the disk unit 1 has portability and a large capacity, the disk unit 1 is superior as a medium for providing application programs. When the disk 2 has both the RAM area 2b and the ROM area 2c as shown in FIG. 6, if an application program is stored in the ROM area 2c in advance, this will increase the convenience in the use of the disk unit 1. It should be noted that the ROM 2c can be formed by pre-embossing, etching or the like as with the servo pattern 20 described earlier.

Figure 7A:
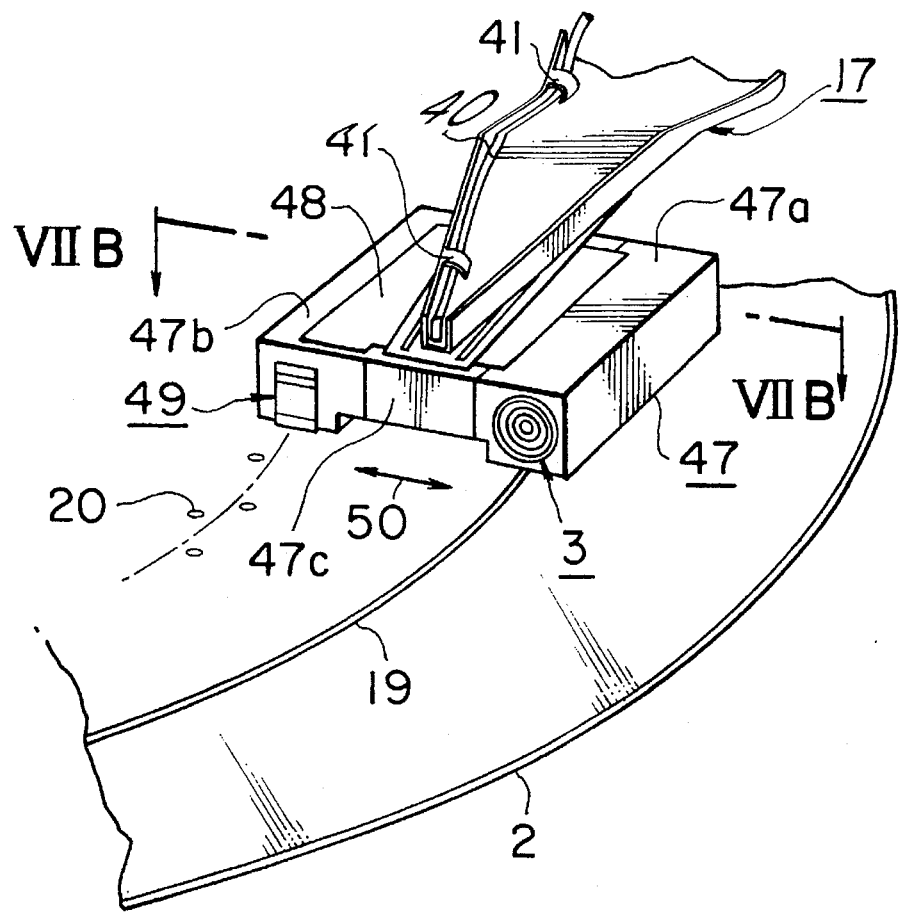
FIG. 7A is a perspective view showing the head portion and the disk according to another embodiment of the present invention.
Figure 7B:
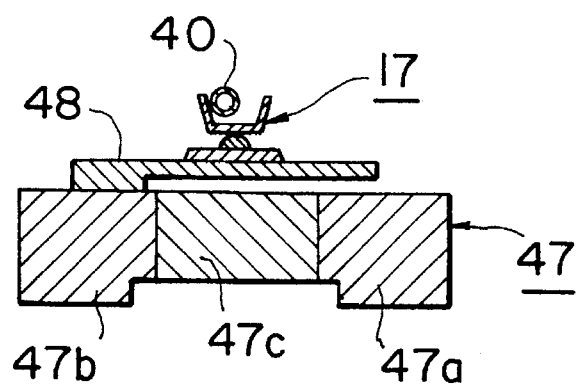
FIG. 7B is a diagram showing a sectional view taken along line 7B—7B in FIG. 7A.

As a second modification, in the embodiment shown in FIGS. 1A to 3, the construction in FIG. 2 can be replaced with the construction shown in FIGS. 7A and 7B. In FIGS. 7A and 7B, those components which are identical with those in FIG. 2 are designated by the same reference numerals. The differences of the construction in FIGS. 7A and 7B from the construction in FIG. 2 are, in addition to the construction of a slider 47, that the arm portion 17 supports the slider 47 through a mounting plate 48, and that an optical head 49 is added as a detector to read the servo patterns 20 on the disk 2. The slider 47 includes first and second members 47a, 47b, which are non-conductive sintered bodies, and a piezoelectric motor (piezoelectric element) 47c as a jogging actuator fixed between the first and second members 47a, 47b. The piezoelectric motor 47c can expand and contract in the direction of the arrows 50 in FIG. 7A. The mounting plate 48 is fixed to the arm portion 17 and the second member 47b, but is not fixed to the first member 47a and the piezoelectric motor 47c. In the example shown in FIGS. 7A and 7B, the optical head 49 reads the servo patterns 20 on the disk 2, so that the position of the slider 47 is detected, and by a detection signal thus produced, the motor portion 22 and the piezoelectric motor portion 47c are controlled, with the result that the head portion 3 is controlled so as to be located at an appropriate position. Accordingly, the head portion can record data or reproduce the recorded data on a specified track 19. Also in the example shown in FIGS. 7A and 7B, instead of using the piezoelectric motor 47c, a slider like the slider 7 in FIG. 2, can be used. However, in the example shown in FIGS. 7A and 7B, since the piezoelectric motor 47c is provided, the head portion 3 can be driven by two drive motors. Thus, the servo characteristics for positioning the head portion 3 are improved.

Figure 8:
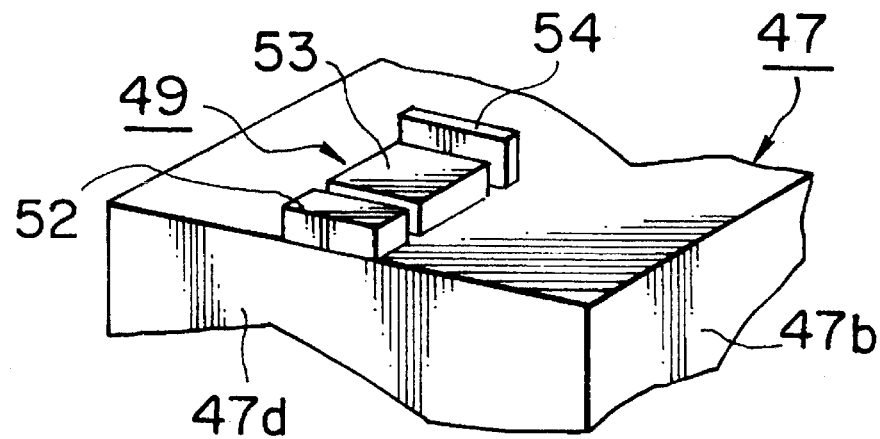
FIG. 8 is a diagram showing an optical head utilized in a head portion shown in FIG. 7A.
Figure 9:
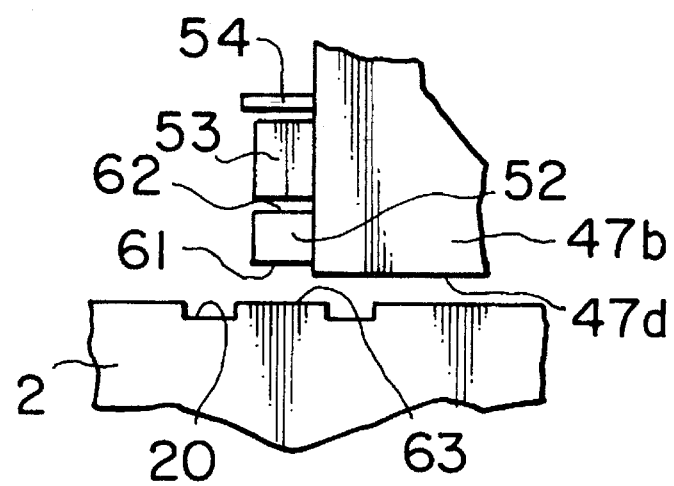
FIG. 9 is a diagram for explaining the principle of servo pattern detection by the optical head shown in FIG. 8.
Figure 10:
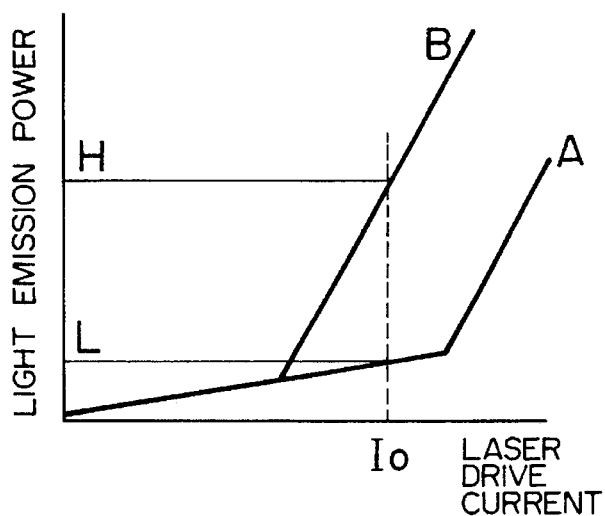
FIG. 10 is a graph for explaining the principle of servo pattern detection by the optical head shown in FIG. 8.

FIG. 8 shows an example of the construction of the optical head 49 shown in FIG. 7A. The optical head 49 comprises a semiconductor laser 52, an optical waveguide 53, and a photo detector 54, formed on a side face of the second member 47b. In FIG. 8, reference numeral 47d denotes a slider surface (facing the disk 2) of the slider 47. The principle of detection of the servo patterns by the optical head 49 will be described with reference to FIGS. 9 and 10. In FIG. 9, the distance h between the light emitting end face 61 of the semiconductor laser 52 and the surface 63 of the disk 2 is set so as to be 5 μm or less, for example. Generally, the semiconductor laser 52 emits light by producing a state of resonance between the light emitting end face 61 and the rear end face 62. Setting the distance h involves selection of the condition for producing a compound phenomenon of resonances, a resonance between the two end faces 61 and 62, and a resonance between the light emitting end face 61 and the surface 63 of the disk 2. In this case, the compound resonance phenomenon does not occur between the light emitting end face 61 and the bottoms of the pits as the servo patterns. The distance h can be set so that the places where the above-described compound resonance phenomenon occurs or does not occur may be changed. Referring to FIG. 10 in which the test results are plotted with the laser drive current as abscissas and light emission power as ordinates, if the laser characteristics are examined, normally, the state A is shown, and when the compound resonance phenomenon occurs, the state B is shown. Therefore, when the laser drive current is $I_0$, binary levels H and L can be obtained by presence or absence of pits.

Figure 11:
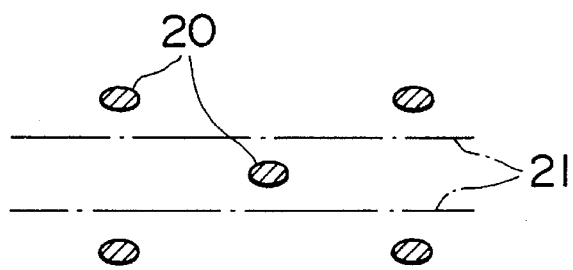
FIG. 11 is a diagram showing a further example of the servo pattern on the disk.
Figure 12:
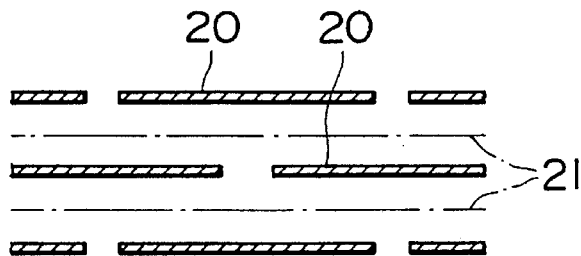
FIG. 12 is a diagram showing the further example of the servo pattern on the disk.

FIGS. 11 and 12 show the examples of the servo patterns 20 formed on the disk 2 when the optical head 49 is used. The servo patterns 20 can be formed by etching, for example. In FIG. 11, the servo patterns 20 as pits in a given row are staggered with respect to the servo patterns in adjacent rows across the track centers 21. In FIG. 12, the servo patterns 20 are arranged as grooves in parallel with the track centers 21, so that the gaps of the grooves in a given row are staggered with respect to the gaps in adjacent rows across the track centers 21. In either case shown in FIGS. 11 and 12, by finding differences between the left and right pit signals, the displacement of the head can be detected.

Note that when an optical disk is used as the disk 2, the above-mentioned optical head 49 can be used as a head (recording/reproducing head) for reading and writing information.

Figure 13A:
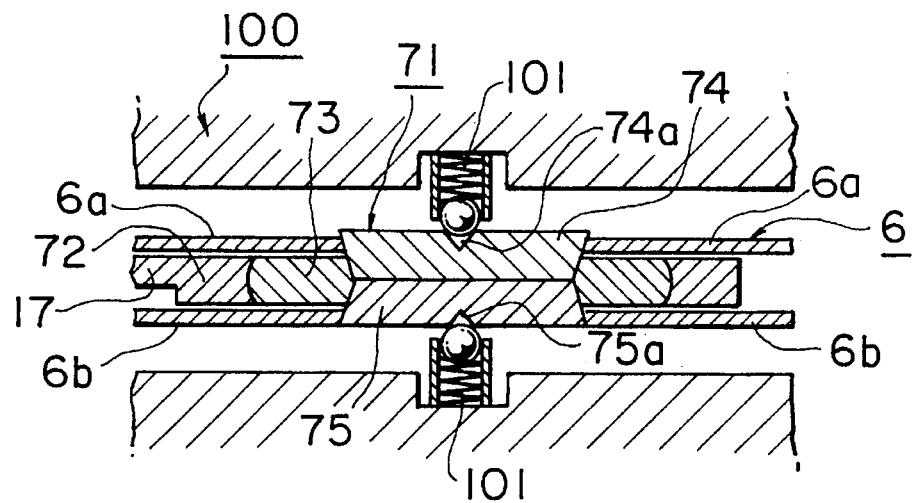
FIG. 13A is a sectional view showing a part of the condition that the disk unit according to the another embodiment of the present invention is mounted on the drive device, and this sectional view corresponds to FIG. 1D.
Figure 13B:
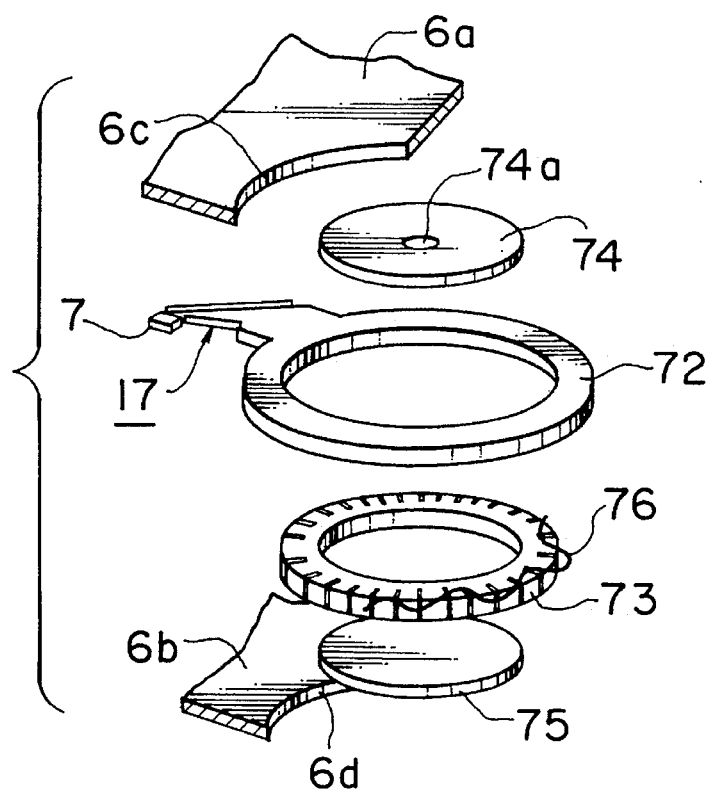
FIG. 13B is an exploded view in perspective of the construction shown in FIG. 13A.

As a third modification, in the embodiment shown in FIGS. 1A to 3, the motor portion 22 shown in FIGS. 1D and 1E, can be replaced by a motor portion 71 shown in FIGS. 13A and 13B. In FIGS. 13A and 13B, the components which are the same as in FIGS. 1D and 1E are designated by the same reference numerals. In the example shown in FIGS. 13A and 13B, the motor portion 71 is formed as another type of annular ultrasonic motor. As shown in FIGS. 13A and 13B, the motor portion 71 includes an annular rotor 72 as a moving portion, an annular stator 73, and disc-shaped retainers 74, 75. The external circumference of the retainer 74 is fixed to the internal circumference of the hole 6c provided at the upper surface portion 6a of the housing portion 6. The external circumference of the retainer 75 is fixed to the internal circumference of the hole 6d provided at the lower surface part 6b of the housing portion 6. The stator 73 is fitted on and fixed to the external circumferences of the retainers 74, 75. On the external circumferential surface of the stator 24, a plurality of piezoelectric elements, which expand and contract in the radial direction of the annular body, are provided in the circumferential direction, so that a progressive wave 76 is produced which turns around in the circumferential direction along the external circumferential surface of the stator 73 as shown in FIG. 13B. The internal circumference of the rotor 2 is fitted to the external circumferential surface of the stator 73. The external circumferential surface of the stator 73 is bent and on the other hand, the internal circumference of the rotor is bent so as to fit snugly to the external circumferential surface of the stator 73. Therefore, the rotor 72 is rotatably supported by the stator 73 so as not fall off. The rotor turns around urged by the progressive wave 76. The arm portion 17 is at one end connected integrally with the rotor 72. At the positions, which correspond to the rotation center of the rotor 72, on the upper surface of the retainer 74 and on the lower surface of the retainer 75, there are formed recessed portions 74a, 75a which respectively fit in with the support mechanisms 101. The motor portion 71 shown in FIGS. 13A and 13B does not have any bearing structure. Therefore, when the motor portion 71 is adopted, the whole disk unit can be reduced in thickness.

Figure 14A:
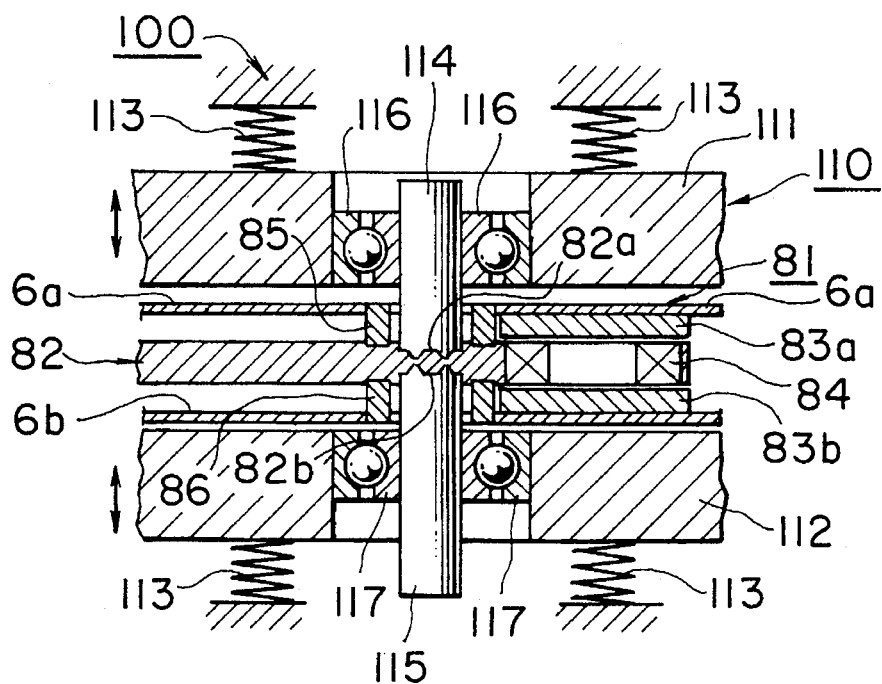
FIG. 14A is a sectional view showing a part of the condition that the disk unit according to a still further embodiment of the present invention is mounted on the drive device, and this sectional view corresponds to FIG. 1D.
Figure 14B:
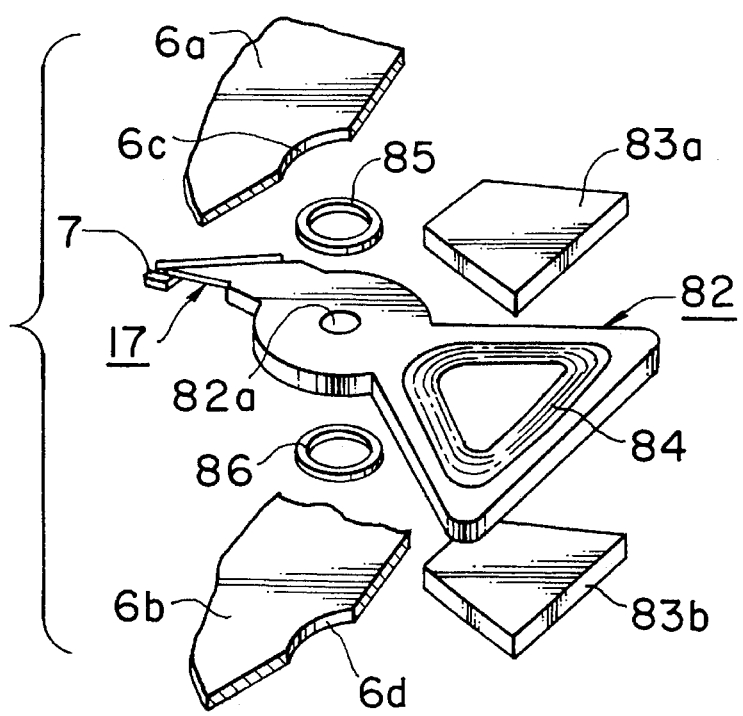
FIG. 14B is an exploded view in perspective of the construction shown in FIG. 14A.

As a fourth modification, in the embodiment shown in FIGS. 1A to 3, the motor portion 22 in FIGS. 1D and 1E can be replaced with a motor portion 81 shown in FIGS. 14A and 14B. In FIGS. 14A and 14B, the components which are identical with those in FIGS. 1D and 1E are designated by the same reference numerals. In the case shown in FIGS. 14A and 14B, the motor portion 81 is formed as a voice coil motor. As shown in FIGS. 14A and 14B, the motor portion 81 includes a swinging portion 82 as a moving portion, permanent magnets 83a, 83b constituting the stators, and cylindrical support members 85, 86. The external circumference of the support member 85 is fixed to the internal circumference of the hole 6c provided at the upper surface portion 6a of the housing portion 6. The external circumference of the support member 86 is fixed to the internal circumference of the hole 6d provided at the lower surface portion 6b of the housing portion 6. The swinging portion 82 is rotatably supported by the support members 85 and 86. Note that this support may be done with low accuracy, in other words, this support may be imperfect. The reason is that the swinging portion 82 is supported perfectly by shafts 114 and 115 of the drive device 100, which will be described later. Note that though detail is not shown in the figures, the swinging portion 82 has formed therein a stepped portion which fit in with the support members 85 and 86, so that the swinging portion 82 does not come off in the left or right direction on FIG. 14A. The swinging portion 82 has a coil 84 built in. The permanent magnets 83a and 83b are respectively fixed to the upper surface portion 6a and the lower surface portion 6b of the housing portion 6. The support members 85 and 86 may be formed integrally with the housing portion 6. At the positions, which correspond to the swing center of the swinging portion 82, on the upper surface and the lower surface of the swinging portion 82, there are formed connecting portions 82a and 82b which fit in snugly with the connecting portions at the end faces of the shafts 114 and 115.

When the motor portion 81 is adopted, the support mechanisms 101 of the drive device 100, shown in FIG. 1C for example, are replaced with the support mechanism 110 shown in FIG. 14A. This support mechanism 110 supports the swinging portion 82 rotatably and perfectly (in other words, with high accuracy) when the disk unit 1 is mounted in the drive device 100. The support mechanism 110 includes moving portions movable only in the up and down directions on FIG. 14A, springs 113 urging the moving portions 111 and 112, shafts 114 and 115, and bearings 116 and 117 supporting the shafts 114 and 115 respectively rotatably. When the disk unit 1 is not mounted in the drive device 100, the moving portions 111 and 112 are retracted upwards and downwards respectively by the springs 113. When the disk unit 1 is mounted in the drive device 100, the moving portions 111 and 112 are moved by a mechanism, not shown, in the direction of pinching the disk unit 1 and are in the condition shown in FIG. 14A. The rotation center lines of the shafts 114 and 115 coincide with each other. The shafts 114 and 115 have formed at the extreme ends thereof the connecting portions which fit in with the connecting portions 82a and 82b of the swinging portion 82. The shape of the connecting portions of the shafts 114 and 115 is so formed that as the connecting portions of the shafts 114 and 115 are pushed to the connecting portions 82a and 82b of the swinging portion 82, their rotating positions come to comply with each other and the corresponding connecting portions fit in with each other completely even when the rotating positions of the shafts 114 and 115 are shifted relative to the rotating position of the swinging portion 82 before they are connected together. Note that when the disk unit 1 is mounted in the drive device 100, the housing portion 6 may be supported by another support mechanism.

The motor portion 81 includes no bearing structure, but the bearing structure is provided on the side of the drive device 100. Therefore, when the motor portion 81 is adopted, the whole disk unit can be made in a thin shape.

Figure 15A:
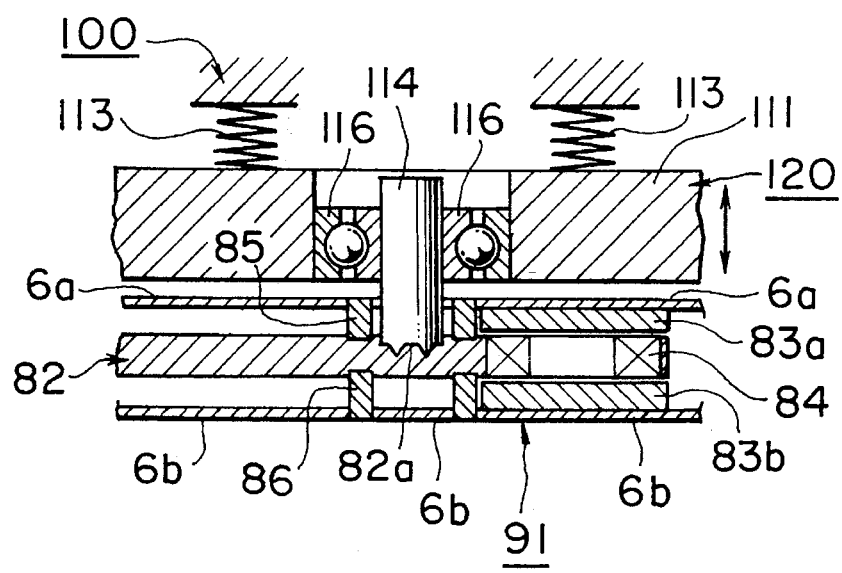
FIG. 15A is a sectional view showing a part of the condition that the disk unit according to the still further embodiment of the present invention is mounted on the drive device, and this sectional view corresponds to FIG. 1D.
Figure 15B:
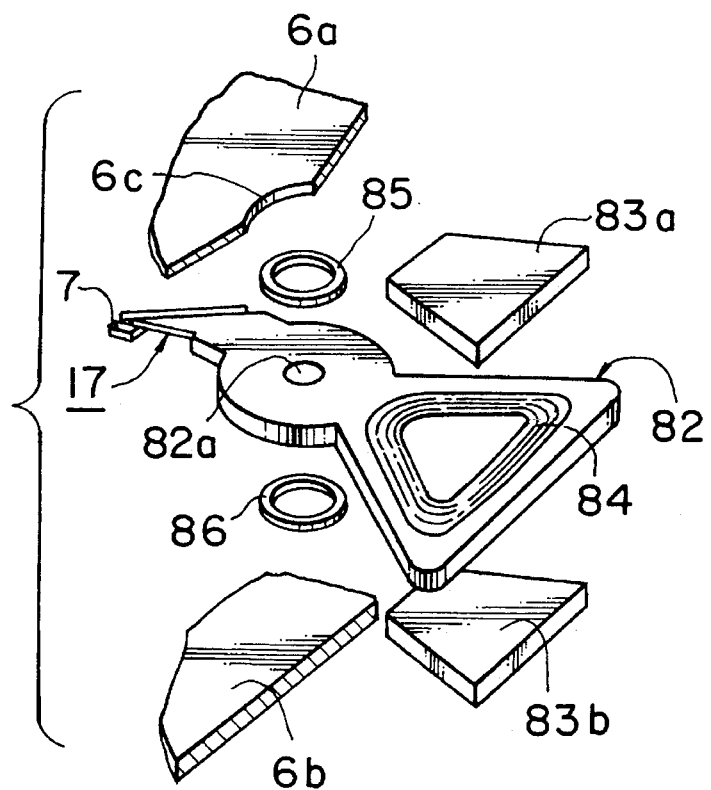
FIG. 15B is an exploded view in perspective of the construction shown in FIG. 15A.

As a fifth modification, in the embodiment shown in FIGS. 1A to 3, the motor portion 22 in FIGS. 1D and 1E can be replaced by a motor portion 91 shown in FIGS. 15A and 15B. The motor portion 91 is substantially the same as the motor 81 shown in FIGS. 14A and 14B. In FIGS. 15A and 15B, the components which are identical with those in FIGS. 14A and 14B are designated by the same reference numerals. The differences of the motor portion 91 from the motor 81 are that there is no connecting portion 82b of the motor portion 81, and that there is no hole 6d at the lower surface portion 6b of the housing portion 6. When the motor portion 91 is adopted, the support mechanisms 101 of the drive device 100 shown in FIG. 1C, for example, is replaced by the support mechanism 120 shown in FIG. 15A. The support mechanism 120 is formed by the upper half of the support mechanism 110 shown in FIG. 14A. Note that when the disk unit 1 is mounted in the drive device 100, the housing portion 6 is supported by another support mechanism (not shown) in the condition shown in FIG. 15A.

The motor portion 91, too, has no bearing structure, but the bearing structure is provided on the side of the drive device 100. Therefore, also when the motor portion 91 is adopted, the whole disk unit can be made in a thin shape.

Figure 16A:
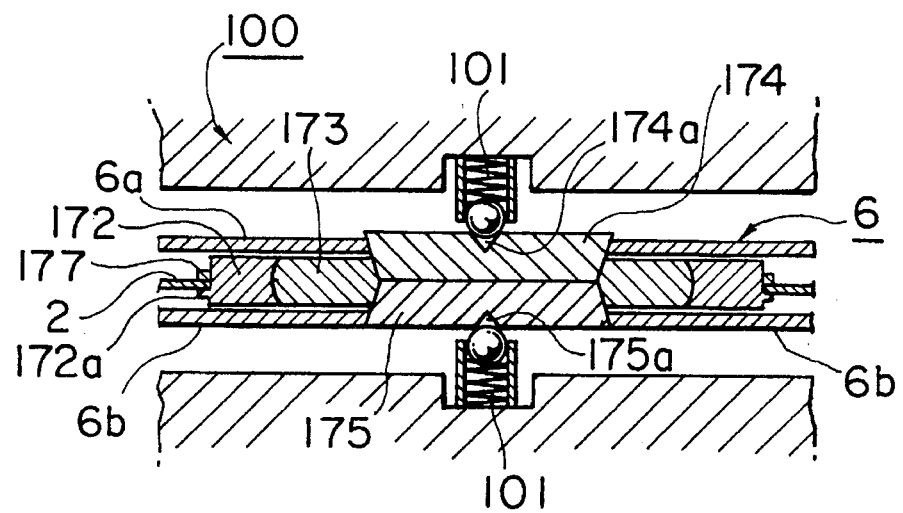
FIG. 16A is a sectional view showing a part of the condition that the disk unit according to the still further embodiment of the present invention is mounted on the drive device, and this sectional view corresponds to FIG. 1F.
Figure 16B:
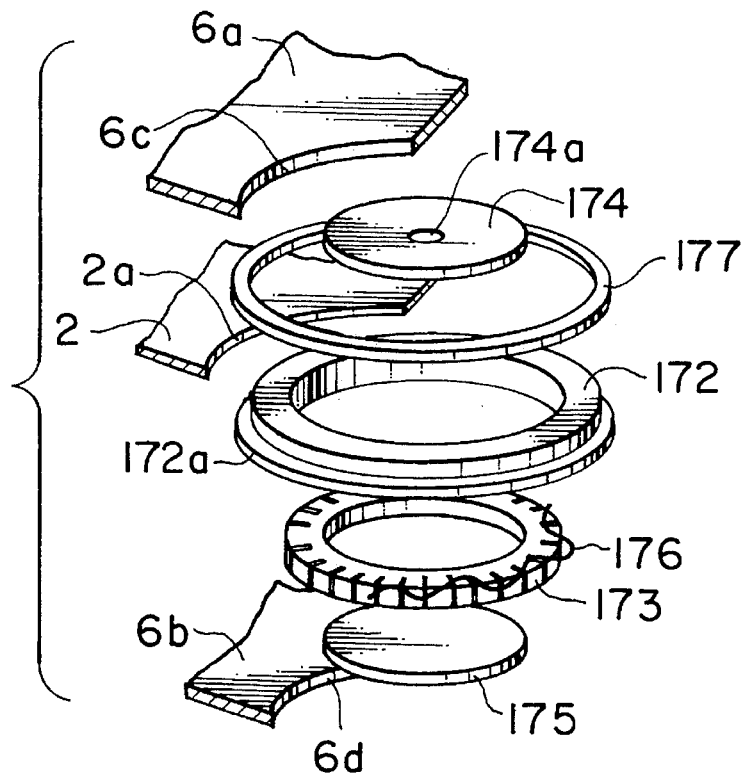
FIG. 16B is an exploded view in perspective of the construction shown in FIG. 16A.

As a sixth modification, in the embodiment in FIGS. 1A and 3, the second actuator portion 5 shown in FIGS. 1F and 1G is replaced by an actuator portion shown in FIGS. 16A and 16B. In FIGS. 16A and 16B, the components which are identical with those in FIGS. 1F and 1G, are designated by the same reference numerals. In the example shown in FIGS. 16A and 16B, an ultrasonic motor is formed which is of the same type as the motor portion 71 shown in FIGS. 13A and 13B. The actuator portion shown in FIGS. 16A and 16B includes an annular rotor 172 as a moving portion, an annular stator 173, disc-shaped retainers 174 and 175, and an annular retaining member 177. The rotor 172, the stator 173, the retainers 174 and 175 correspond to the rotor 72, the stator 73, and the retainers 74 and 75, and therefore, their detailed descriptions are omitted. In the case of the actuator portion shown in FIGS. 16A and 16B, however, the rotor 172 has a flange 172a formed around the external circumference thereof, the rotor 172 is fitted in the hole 2a provided at the center of the disk 2, and the disk 2 is placed and fixed between the flange 172a and the retaining member 177. In FIGS. 16A and 16B, reference numeral 176 denotes a progressive wave produced by the stator 173, and 174a and 175a denote recessed portions corresponding to the recessed portions 25a and 26a in FIG. 1D. The actuator portion shown in FIGS. 16A and 16B has no bearing structure. Therefore, also when this actuator portion is adopted, the whole disk unit can be made in a thin shape.

Figure 17A:
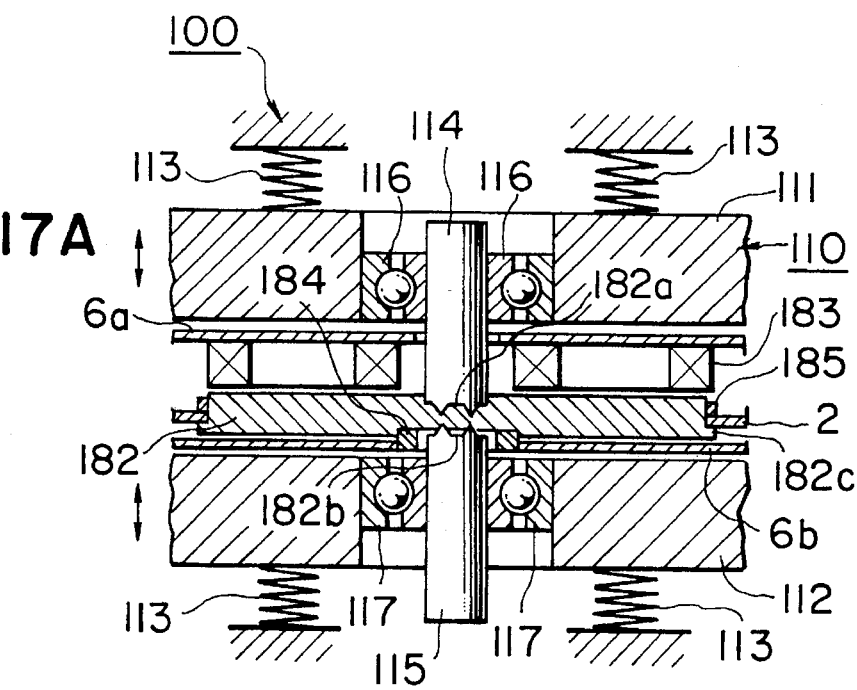
FIG. 17A is a sectional view showing a part of the condition that the disk unit according to the still further embodiment of the present invention is mounted on the drive device, and this sectional view corresponds to FIG. 1F.
Figure 17B:
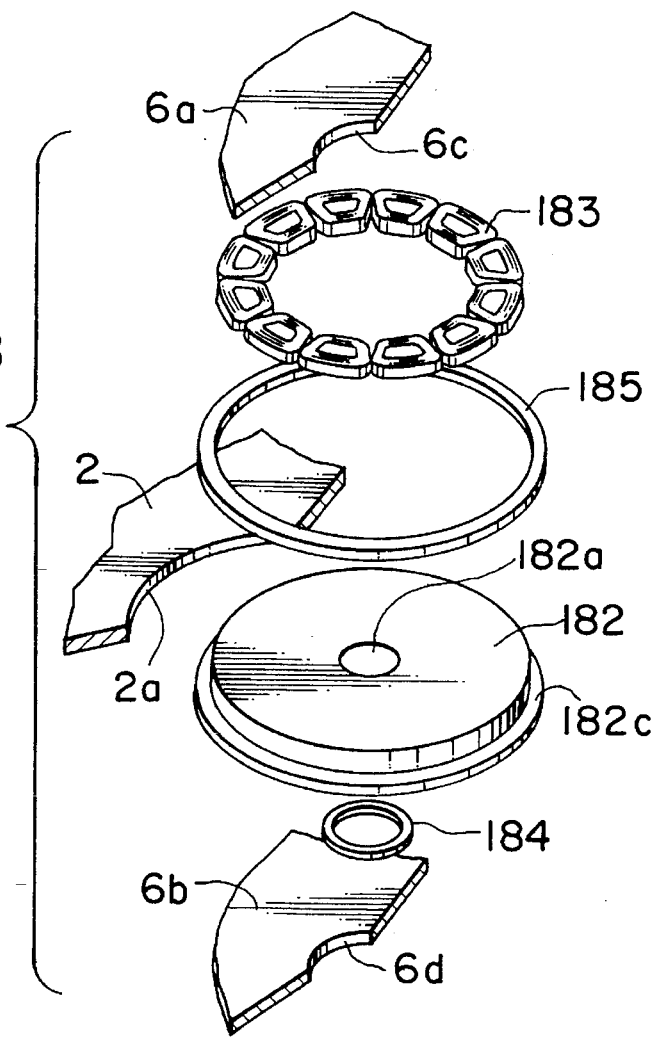
FIG. 17B is an exploded view in perspective of the construction shown in FIG. 17A.

As a seventh modification, in the embodiment shown in FIGS. 1A to 3, the second actuator portion 5 shown in FIGS. 1F and 1G can be replaced by an actuator shown in FIGS. 17A and 17B. In FIGS. 17A and 17B, the components which are identical with those in FIGS. 1F and 1G, are designated by the same reference numerals. The actuator portion shown in FIGS. 17A and 17B is formed as a d.c. or a.c. brushless motor. As shown in FIGS. 17A and 17B, this actuator portion includes a disc-shaped permanent-magnet rotor 182 as a moving portion, a coil portion 183 constituting the stator, a annular support member 184, and an annular retaining member 185. The external circumference of the support member 184 is fixed to the internal circumference of the hole 6d provided at the lower surface portion 6b of the housing 6. The rotor 182 is rotatably supported by the support member 184. Note that this support may be done with low accuracy, that is, may be imperfect. The reason is that the rotor 182 is supported perfectly by the shafts 114 and 115 of the drive device 100, which will be described later. Note that though detail is not shown in the figures, the rotor 182 has grooves formed which fit in with the support members 85, 86, so that the rotor 182 does not come off in the left or right direction on FIG. 17A. The rotor 182 has a flange 182c formed along the external circumference thereof, the rotor 182 is fitted in the hole 2a provided at the center of the disk 2, and the disk 2 is placed and fixed between the flange 182c and the retaining member 185. The coil portion 183 is fixed to the upper surface portion 6a of the housing portion 6. The support member 184 may be formed integrally with the housing portion 6. At the positions, which correspond to the rotation center of the rotor 182, of the upper and the lower surfaces of the rotor 182, there are provided connecting portions 182a and 182b which fit in with the connecting portions formed at the extreme ends of the shafts 114 and 115.

When the actuator portion shown in FIGS. 17A and 17B is adopted, the support mechanisms 101 of the drive device 100 shown in FIG. 1C, for example, is replaced by the support mechanism 110 shown in FIG. 17A. The support mechanism 110 shown in FIG. 17A is the same as the support mechanism shown in FIG. 14A, and therefore, the same components are designated by the same reference numerals, and their descriptions are omitted. In the case shown in FIGS. 17A and 17B, when the disk unit 1 is mounted in the drive device 100, the support mechanism 110 supports the rotor 182 rotatably and perfectly (in other words, with high accuracy).

The actuator portion shown in FIGS. 17A and 17B has no bearing structure, but the bearing structure is provided on the side of the drive device 100. Therefore, also when this actuator portion is adopted, the whole disk unit can be made in a thin shape.

Figure 18A:
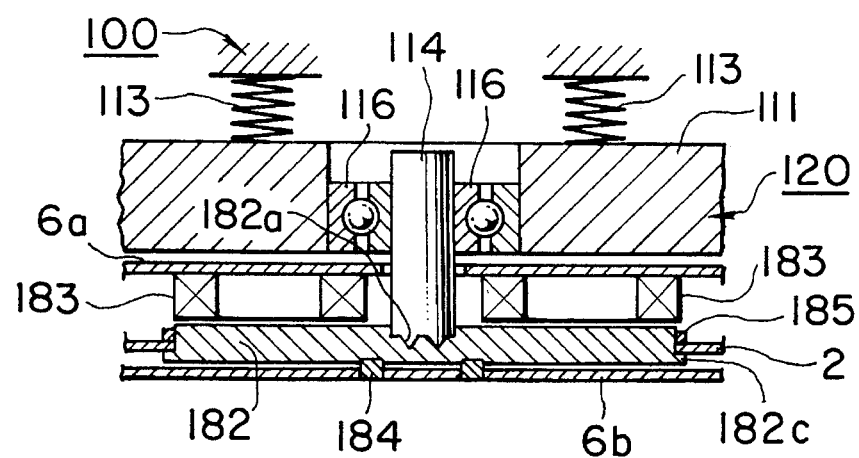
FIG. 18A is a sectional view showing a part of the condition that the disk unit according to the still further embodiment of the present invention is mounted on the drive device, and this sectional view corresponds to FIG. 1F.
Figure 18B:
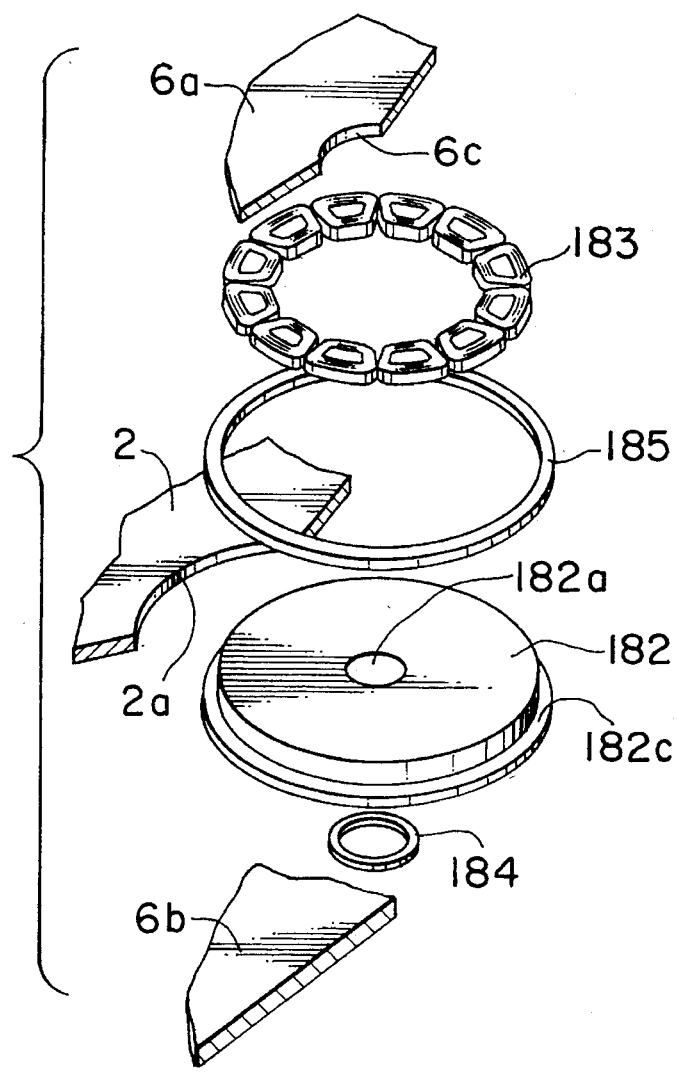
FIG. 18B is an exploded view in perspective of the construction shown in FIG. 18A.

As an eighth modification, in the embodiment of the embodiment shown in FIGS. 1A to 3, the second actuator portion 5 shown in FIGS. 1F and 1G can be replaced by an actuator portion shown in FIGS. 18A and 18B. The actuator portion shown in FIGS. 18A and 18B is substantially the same as the actuator portion shown in FIGS. 17A and 17B. In FIGS. 18A and 18B, the components which are identical with those shown in FIGS. 17A and 17B are designated by the same reference numerals. The differences of the actuator portion shown in FIGS. 18A and 18B from the actuator portion shown in FIGS. 17A and 17B are that the connecting portion 182b in FIG. 17A and the hole 6d at the lower surface portion 6b of the housing portion 6 in FIG. 17B have been obviated. When the actuator portion shown in FIGS. 18A and 18B is adopted, the support mechanisms 101 of the drive device shown in FIG. 1C, for example, are replaced by the support mechanism 120 shown in FIG. 18A. The support mechanism 120 is formed by the upper half of the support mechanism 110 shown in FIG. 17A. Note that when the disk unit 1 is mounted in the drive device 100, the housing portion 6 is supported by another support mechanism (not shown) in the condition shown in FIG. 18A.

The actuator portion shown in FIGS. 18A and 18B, too, has no bearing structure, but the bearing structure is provided on the side of the drive device 100. Therefore, also when the actuator portion is adopted, the whole disk unit can be made in a thin shape.

In the embodiment shown in FIGS. 1A to 3, the motor portion 22 shown in FIGS. 1D and 1E may be replaced by a brushless motor constructed like the brushless motor shown in FIGS. 17A and 17B or by a brushless motor like the brushless motor shown in FIGS. 18A and 18B.

Figure 19:
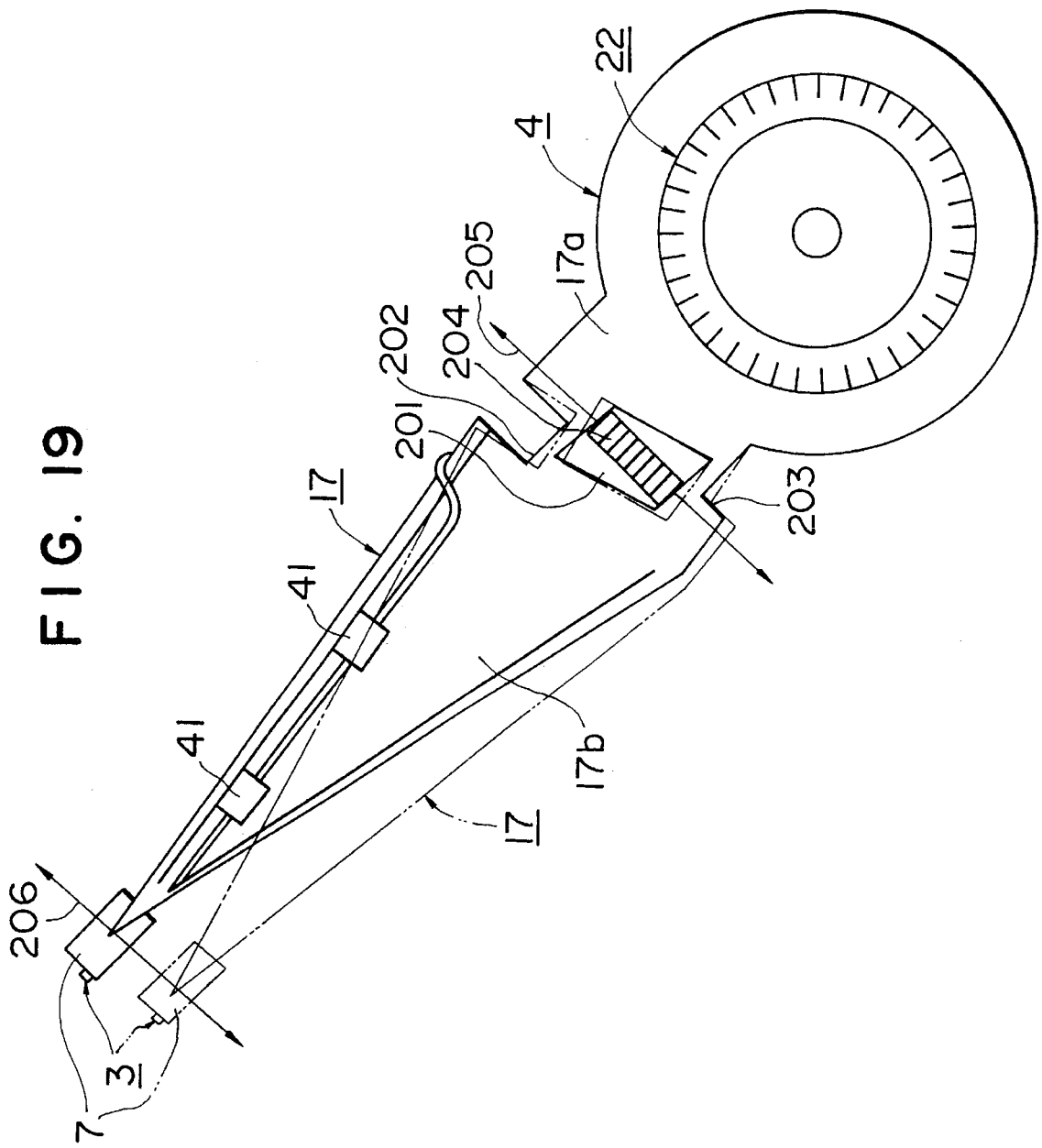
FIG. 19 is a plan view showing the actuator portion used in the disk unit according to the still further embodiment of the present invention.

As a ninth modification, in the embodiment shown in FIGS. 1A to 3, as shown in FIG. 19, the arm portion may be provided with a hole 201 substantially in a parallelogramatical shape and notches 202, 203, and a piezoelectric motor (piezoelectric element) may be mounted in the hole 201. The piezoelectric motor 204 can expand and contract in the direction of the arrows 205, and applies a driving force to expand the hole 201 substantially in the direction of the diagonal line (i.e., in the direction of the arrows 205) of its parallelogramatic shape. The arm portion 17 around the hole 201 is formed in a shape determined by notches 202 and 203 so as to be distorted such that a portion 17b extending from the hole 201 toward the slider 7 moves in the direction of the arrow 206 (toward the lower left of FIG. 19) relative to a portion 17a extending from the hole 201 toward the motor portion 22 by an elastic deformation of the surrounding area of the hole 201 when the above-mentioned driving force is applied to the arm portion 17 by the piezoelectric motor 204. The arm portion 17 is formed by a metal plate, such as a stainless plate, for example. The arm portion 17 is in the position indicated by the solid line in FIG. 19 when the piezoelectric motor 204 contracts, and moves to the position indicated by the broken line in FIG. 19 when the piezoelectric motor 204 expands in the direction of the arrows 205. In the example shown in FIG. 19, since the piezoelectric motor 204 is provided in addition to the motor portion 22, the head portion 3 can be driven by a plurality of drive motors. Therefore, the servo characteristics for positioning the head portion 3 are improved.

Figure 20B:
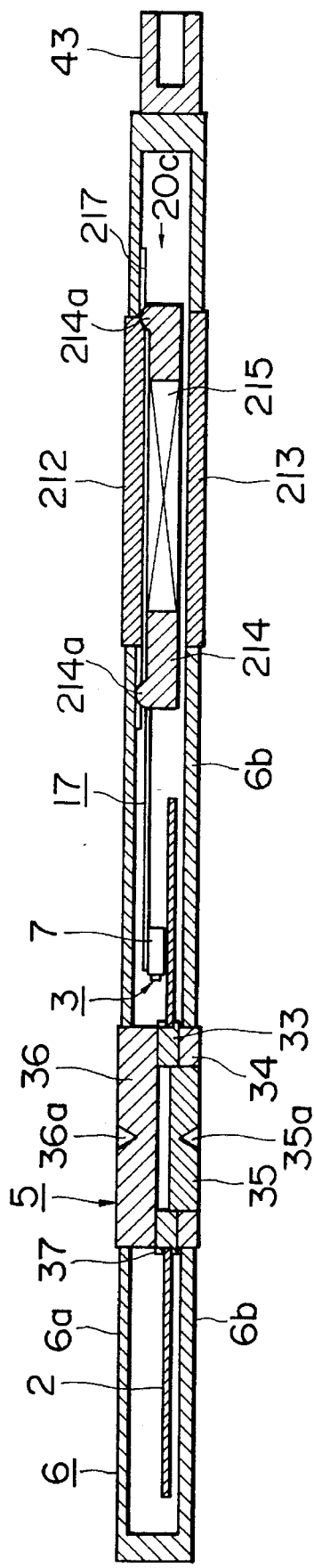
FIG. 20B is a diagram showing a sectional view taken along line 20B—20B in FIG. 20A.
Figure 20C:
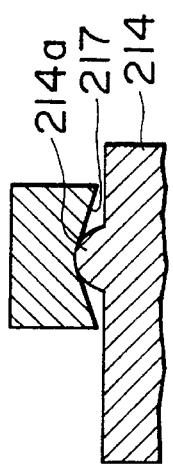
FIG. 20C is a view in the direction of the arrow 20C in FIG. 20B.

As a tenth modification, in the embodiment shown in FIGS. 1A to 3, the motor portion 22 shown in FIGS. 1A to 1C can be replaced by a motor portion 211 shown in FIGS. 20A to 20C. FIG. 20A is a plan view of the disk unit according to the still further embodiment of the present invention and shows the condition that the upper surface portion of the housing portion 6 has been removed. FIG. 20B is a view taken along line 20B—20B in FIG. 20A. FIG. 20C is a view in the direction of the arrow 20C in FIG. 20B. In FIGS. 20A to 20C, the components which are identical with those in FIGS. 1A to 11C are designated by the same reference numerals, and their descriptions are omitted.

As shown in FIGS. 20A to 20C, the motor portion 211 includes permanent magnets 212 and 213 constituting the stator, a moving member 214 and a coil 215 wound on the moving member 214, and a support member 216 which is integral with the housing portion 6. The motor portion 211 supports the moving member 214, and is capable of elastic deformation so as to allow the moving member 214 to move linearly in the radial direction of the disk 2. The permanent magnets 212 and 213 are respectively fixed to the internal circumferences of the upper surface portion 6a and the lower surface portion 6b of the housing portion 6. The support member 216 includes a thick-walled portion 216a having rigidity and thin-walled portions 216b, 216c having elasticity, said thin-walled portions 216b and 216c being provided between the thick-walled portion 216a and the side face portion of the housing portion 6. The moving member 214 is fixed to the thin-walled portions 216b and 216c, and is capable of moving linearly by the elastic deformation of the thin-walled portions 216b and 216c. The moving member 214 has convex portions 214a formed on the upper surface thereof. At the upper surface portion 6a of the housing portion 6, there are formed guide rails 217 for precisely guiding the moving member 214 in the radial direction of the disk 2 with the convex portions 214a engaging the guide rail 217. The arm portion 17 is connected at one end to the moving member 214. According to the motor portion 211, a force is generated by an interaction between a magnetic field produced by the permanent magnets 212 and 213, and a magnetic field produced by a current flowing through the coil 215, and by this force, the thin-walled portions 216a and 216c are deformed by elastic deformation, causing the moving member 214 to move linearly, so that the head portion 3 moves linearly in the radial direction of the disk 2. Since the head portion 3 moves linearly in the radial direction of the disk 2 as described above, even when the recording-reproduction-separated type head as shown in FIG. 3 is adopted as the head portion 3, the center of the recording portion 8 and the center of the reproducing portion 9 can be made to coincide with each other.

Figure 21:
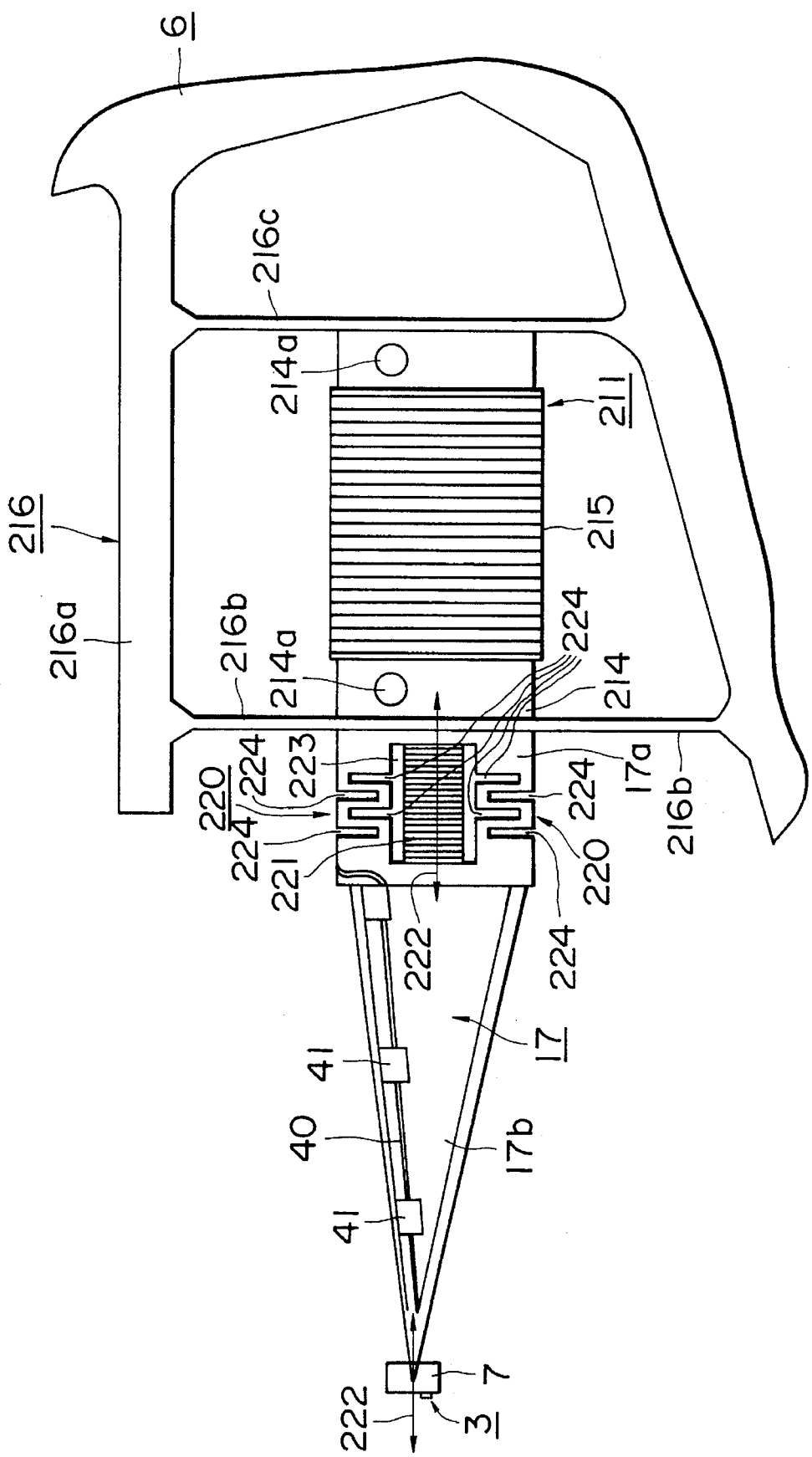
FIG. 21 is a plan view showing the actuator portion used in the still further embodiment of the present invention.

As an eleventh modification, in the embodiment shown in FIGS. 20A to 20C, the arm portion 17 may be provided with an elastic deformation portion 220 and a piezoelectric motor (piezoelectric element) 221 as shown in FIG. 21. The elastic deformation portion 220 is capable of elastic deformation such that a portion 17b of the arm portion located on the slider side, that is, opposite the side of the elastic deformation portion 220 moves relative to a portion 17a of the arm portion located on the side of the elastic deformation portion 220 and adjacent to the moving member 214. In this case, the elastic deformation portion 220 is provided in the arm portion 17 by forming a rectangular hole and a plurality of notches 224 staggered on either side of the rectangular hole. The arm portion 17 is formed by a metal plate such as a stainless plate, for example. The piezoelectric motor 221 can expand and contract in the direction of the arrows 222, and applies a driving force to the arm portion 17 so that the elastic deformation portion 220 is deformed in elastic deformation in the direction of the arrows 222. In the example shown in FIG. 21, the piezoelectric motor 221 is provided in addition to the motor 211, and therefore, the head portion 3 can be driven by a plurality of drive motors. Thus, the servo characteristics for positioning the head portion 3 are improved.

Various modifications of the embodiment shown in FIGS. 1A to 3 have been described. Those modifications may be applied independently to the embodiment shown in FIGS. 1A to 3. Any combination of those modifications may be applied to the embodiment shown in FIGS. 1A to 3.

Figure 22:
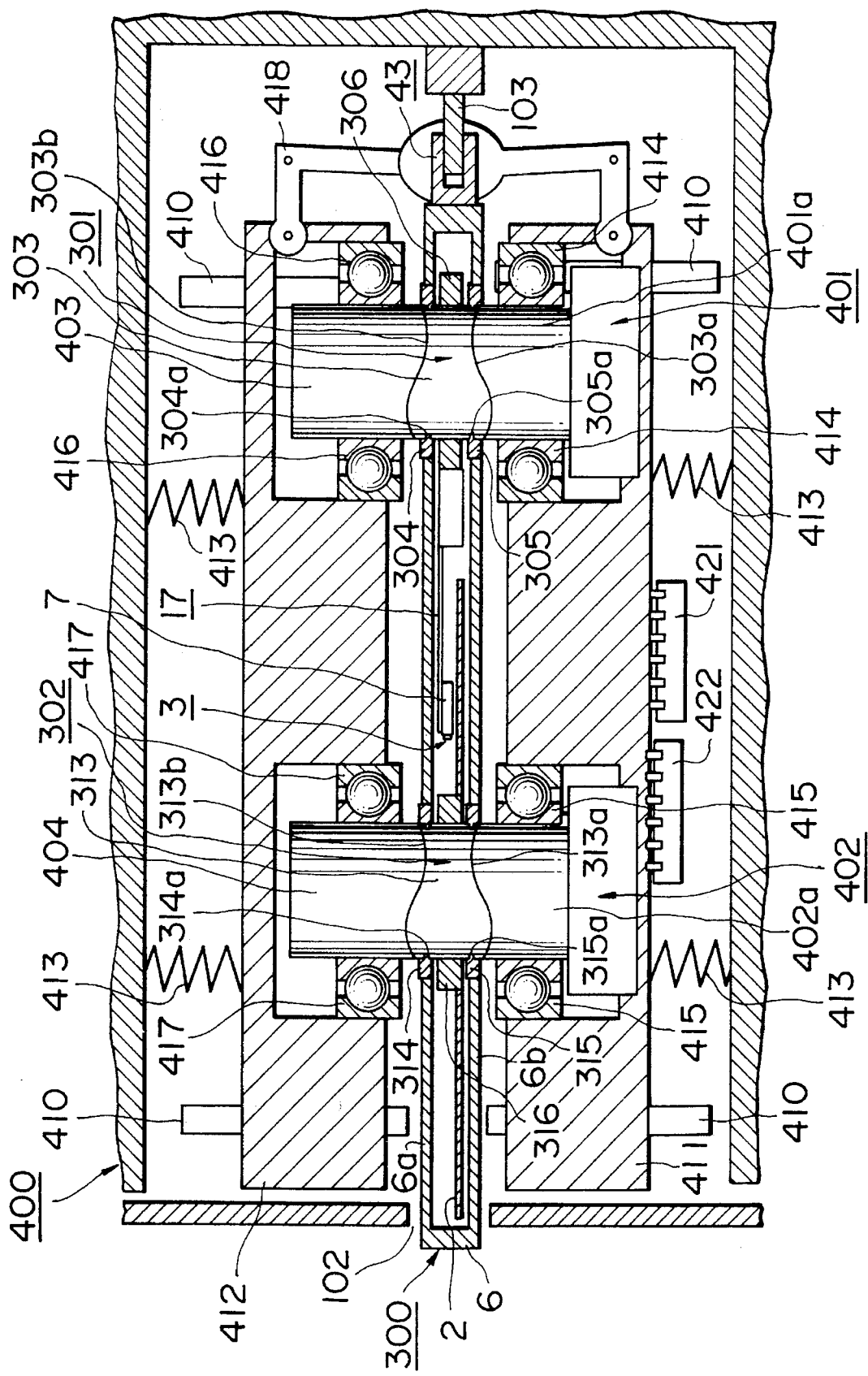
FIG. 22 is a sectional view showing the condition that the disk unit according to the still further embodiment of the present invention is mounted on the drive device.

FIG. 22 shows the condition that the disk unit 300 according to the still further embodiment of the present invention is mounted in the drive device 400. The drive device 400 drives the disk unit 300 to read and write information from and on the disk 2. In FIG. 22, the components which are identical with those shown in FIGS. 1A to 3 are designated by the same reference numerals, and their descriptions are omitted.

As shown in FIG. 22, the disk unit 300 comprises a recording medium disk 2; a head portion 3 for read and write information on the disk 2; a first driven portion 301, adapted to be operatively connected to a first driving portion 401, for moving the head portion 3 relative to the disk 2 by being driven by the first driving portion 401 when the first driven portion 301 is connected to the first driving portion 401; a second driven portion 302, adapted to be operatively connected to a second driving portion 402, for rotating the disk 2 by being driven by the second driving portion 402 when the second driven portion 302 is connected to the second driving portion 402; and a housing portion 6 for housing the disk 2, the head portion 3, and the first and second driven portions 301 and 302. The first and second driving portions 401 and 402 are provided outside the housing portion 6, and constitute a part of the drive device 400 in this embodiment.

In this embodiment, the first driven portion 301 includes a shaft member 303 rotatably supported by the housing portion 6, the arm portion 17, and the slider 7. As shown in FIG. 22, the external circumference of an annular member 304, which has a flange portion 304a formed at the internal circumference thereof, is fixed to the internal circumference of the hole provided at the upper surface portion 6a of the housing portion 6. Likewise, the external circumference of an annular member 305, which has a flange portion 305a formed at the internal circumference thereof, is fixed to the internal circumference of the hole provided at the lower surface portion 6b of the housing portion 6. The shaft member 303 has grooves formed at the external circumference thereof. The flange portions 304a and 305a are fitted into those grooves of the shaft member 303, so that the shaft member 303 is rotatably supported by the housing portion 6 through the annular members 304 and 305. This support may be done with low accuracy, that is, this support may be imperfect. The reason is that the shaft member 303 is supported perfectly by an output shaft 401a and a shaft 403, which will be describe later. An annular member 306 is fitted and fixed to the external circumference of the housing portion 6. This annular member 306 is connected to one end of the arm portion 17. In other words, the shaft member 303 is connected to one end of the arm portion 17 through the annular member 306. In this embodiment, the shaft member 303 protrudes a little from the upper and the lower surfaces of the housing portion 6, but can be rotatably supported by the housing portion 6 without those protrusions. At the upper and the lower surfaces of the shaft member 303, there are provided connecting portions 303a and 303b which fit in with the connecting portions formed at the extreme ends of the output shaft 401a and the shaft 403, which will be described later. As can be understood from the foregoing description, in this embodiment, the first driven portion 301 has no bearing structure.

In this embodiment, the second driven portion 302 has a shaft member 313 rotatably supported by the housing portion 6. As shown in FIG. 22, the external circumference of the annular member 314 having a flange 314a formed at the internal circumference thereof is fixed to the internal circumference of the hole provided at the upper surface portion 6a of the housing portion 6. Likewise, the external circumference of the annular member 315, which has a flange portion 315a formed at the internal circumference thereof, is fixed to the internal circumference of the hole provided at the lower surface portion of the housing portion 6. The shaft member 313 has grooves formed at the external circumference. The flange portions 314a and 315a are fitted into the grooves of the shaft member 313, and therefore, the shaft member 313 is rotatably supported by the housing portion 6 through the annular members 314 and 315. This support may be done with low accuracy, in other words, this support may be imperfect. The reason is that the shaft member 313 is supported perfectly by an output shaft 402a and a shaft 404. The annular member 316 is fitted and fixed to the external circumference of the housing portion 6. The external circumference of the annular member 316 is fitted in and fixed to the hole 2a at the center of the disk 2. In this embodiment, the shaft member 303 protrudes a little from the upper surface and the lower surface of the housing portion 6, but can be rotatably supported by the housing portion 6 without those protrusions. At the upper surface and the lower surface of the shaft member 313, there are provided connecting portions 313a and 313b which fit in with the connecting portions at the end faces of the output shaft 402a and the shaft 404, which will be described later. As is obvious from the foregoing description, in this embodiment, the second driven portion 302 has no bearing structure. The thickness of the first and the second driven portions 301 and 302 is preferably 5 mm or less, respectively, and more preferably 3.5 mm or less.

When information is read from or written on the disk unit 300, the disk unit is inserted through a slot 102 into the drive device 400 as shown in FIG. 22.

The drive device 400 includes moving portions 411 and 412 only movable in the vertical direction of FIG. 22 as they move guided by guide rails 410, springs 413 for urging the moving portions 411 and 412, a rotary motor adopted as the first driving portion 401 and mounted in the moving portion, a rotary motor adopted as the second driving portion 402 and mounted in the moving portion 411, a bearing 414 supporting the output shaft 401a of the rotary motor rotatably as the first moving portion 401, a bearing 415 supporting the output shaft 402a of the rotary motor rotatably as the second driving portion 402, the shafts 403 and 404 mounted in the moving portion 412, and bearings 416 and 417 respectively supporting the shafts 403 and 404 rotatably. The rotation center line of the output shaft 401a and the rotation center line of the shaft 403 coincide with each other, while the rotation center line of the output shaft 402 and the rotation center line of the shaft 404 coincide with each other. At the end faces of the output shaft 401a and the shaft 403, there are formed connecting potions which fit in with the connecting portion 303a and 303b of the shaft member 303. The shape of the connecting portions is so formed that as the connecting portions of the output shaft 401a and the shaft 403 are pushed to the connecting portions 303a and 303b of the shaft member 303, their rotating positions or the like automatically come to coincide with each other and the corresponding connecting portions fit in with each other completely even when the rotating positions or the like of the output shaft 401a and the shaft 403 are shifted relative to the rotating position or the like of the shaft member 303 before they are connected together. Likewise, at the end faces of the output shaft 402a and the shaft 404, there are formed respectively connecting portions which fit in with the connecting portions 411 and 412 of the shaft member 313. The moving portions 411 and 412 are connected with a cam and a link mechanism 418. When the disk unit 300 is not mounted in the drive device 400, the moving portions 411 and 412 are retracted upward and downward by the forces of the springs, and when the disk unit 300 is mounted in the drive device 400, the moving portions 411 and 412 are moved by the cam and the link mechanism 418 in the direction of pinching the disk unit 300, and as shown in FIG. 22, those coupling parts are connected, so that the shaft members 313 and 303 are supported rotatably and perfectly (in other words, with high accuracy). Note that disk unit 300 is mounted in the drive device 400, the housing portion 6 may be supported by another support mechanism.

The drive device 400, like the earlier-mentioned drive device 100, includes an interface connector 103 which fits in with the interface connector portion 43. When the disk unit 300 is mounted in the drive device 400, the interface connector portion 43 fits in with the interface connector portion 103. For example, the drive device 400 forms a part of a computer system, and the CPU of the computer system transmits data and control signals to and from the disk unit 300 through the interface connector 103. The drive device 400 has control circuits 421 and 422, which respectively control the first and the second driving portions 401 and 402. The CPU also sends and receives control signals to and from the control circuits 421 and 422. When the disk unit 300 is mounted in the drive unit 400, by control signals supplied from the CPU, the drive device recognizes the disk unit 300 mounted, controls the rotation of the disk 2, and controls recording and reproduction, so that data is recorded on the disk 2, and data is reproduced (read). In this embodiment, the control circuits 421 and 422 are separated, but can be integrated into one circuit. Though not shown in the figures, a circuit for processing data or the like to read or write may all be contained in the housing portion 6 in the disk unit, or may all be mounted in the drive device 400, or the circuit may be separated and installed in the disk unit 300 and the drive device 400.

The disk unit 300 does not have the first driving portion 401 and the second driving portion 402, but those driving portions 401 and 402 are mounted in the drive device 400. Therefore, the whole disk unit can be made in a thin product.

The description of the size or the like of the earlier-mentioned disk unit 1 also applies to the disk unit 300.

Like in the cases shown in FIGS. 15A and 18A, the upper half of the construction shown in FIG. 22 can be obviated.

Each of or an optional combination of the first, second and ninth modifications etc. may be applied to the disk unit 300 shown in FIG. 22.

Figure 23:
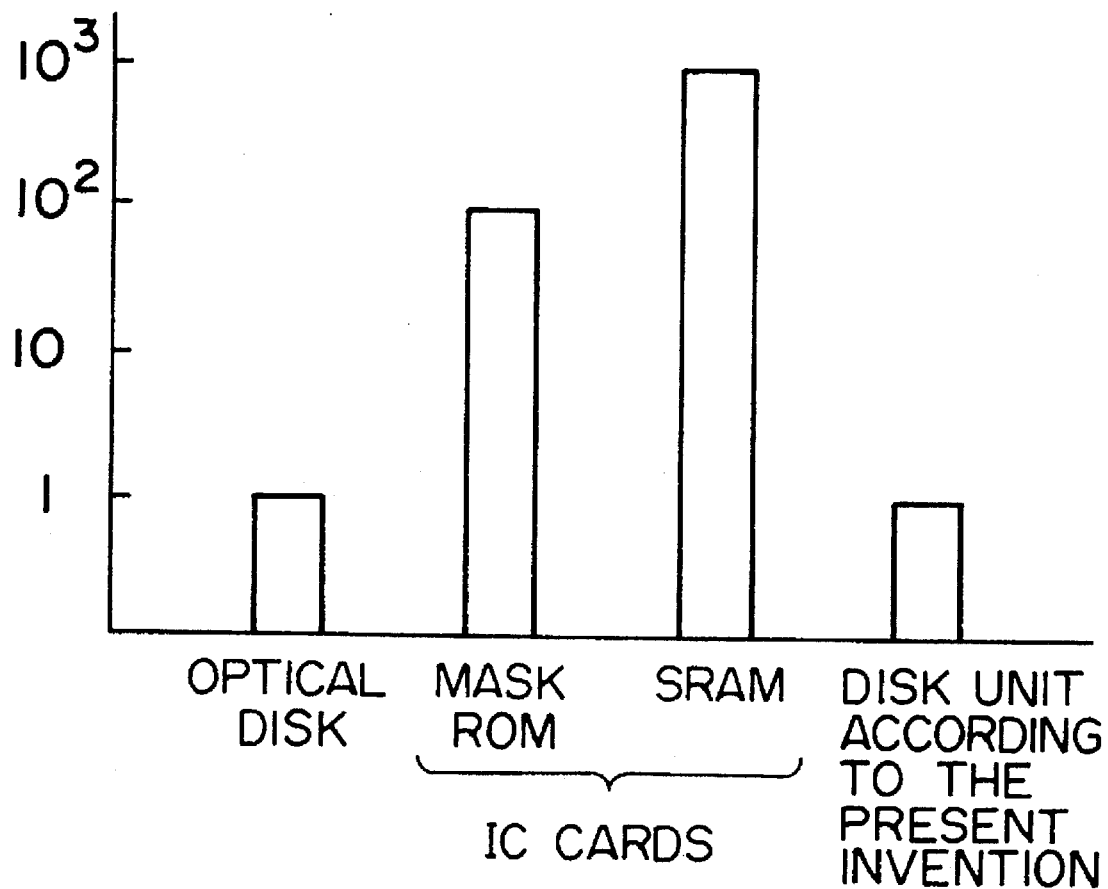
FIG. 23 is a diagram comparing the bit cost of the disk unit according to the embodiment of the present invention with the bit cost of the conventional disk unit.

The greatest advantage of the disk unit according to the present invention when compared with an IC card is that the bit cost is small. FIG. 23 shows an example of a unit cost per bit of each type of memory, roughly calculated. If the unit cost per bit of an optical disk is expressed by 1, the unit cost per bit is about 100 for a mask-ROM IC card and about 1000 for an SRAM card. In the case of the disk unit according to the present invention, the unit cost per bit can be made at about an equal level as that of an optical disk.

As has been described, according to the present invention, it is possible to provide a small-size large-capacity external memory unit at a low cost. By a mixed use with an IC card, the number of degrees of freedom in the use of a memory can be increased. Accordingly, it becomes easy to handle large quantities of data, such as image information, and this will greatly contributes to the progressive development of the advanced information-oriented society.

We claim:

1. A disk unit comprising:
    a recording medium disk;
    head means for reading and writing information on said disk;
    first actuator means for moving said head means relative to said disk;
    second actuator means for rotating said disk, said second actuator means including a stator and a moving portion movable with respect to said stator by interaction with said stator, said stator and said moving portion having no bearing structure therebetween; and
    housing means for housing said disk, said head means, and at least a part of said first actuator means and said second actuator means, said stator being fixedly coupled with said housing means.

2. A disk unit according to claim 1, wherein said disk has a diameter approximately in a range of 51 mm.

3. A disk unit according to claim 1, wherein said first actuator means and said second actuator means respectively have a thickness approximately in a range of 5 mm.

4. A disk unit according to claim 1, wherein said housing means has external dimensions, including a length approximately in a range of 55 mm, a width approximately in a range of 86 mm, and a thickness approximately in a range of 3.5 mm.

5. A disk unit according to claim 1, further comprising connector means, provided at a side face of said housing means, for electrical connection to transmit information to and from said head means.

6. A disk unit according to claim 5, wherein said housing means and said connector means have combined external dimensions, including a length approximately in a range of 55 mm, a width approximately in a range of 86 mm, and a thickness approximately in a range of 5.5 mm.

7. A disk unit according to claim 1, wherein said housing means and said connector means have combined external dimensions of thickness approximately in a range of 3.5 mm.

8. A disk unit according to claim 1, wherein at least a part of a circuit for controlling said first and second actuator means and processing said information is included in said housing means.

9. A disk unit according to claim 1, wherein said head means includes a recording-reproduction-separated type head having a recording portion for writing information on said disk and a reproducing portion for reading information from said disk.

10. A disk unit according to claim 9, wherein said disk has servo patterns formed thereon for detection and control of the position of said head means, and wherein said reproducing portion functions as a detector for reading said servo patterns.

11. A disk unit according to claim 9, wherein said disk has servo patterns formed thereon for detection and control of the position of said head means, and wherein said head means further includes a detection head for reading said servo patterns.

12. A disk unit according to claim 11, wherein said detection head includes an optical head.

13. A disk unit according to claim 1, wherein said disk includes a magnetic disk and said head means includes a magnetic head.

14. A disk unit according to claim 13, wherein said magnetic disk has servo patterns, formed thereon as changes of shape or changes of the magnetic characteristics, for detection and control of the position of said head means.

15. A disk unit according to claim 1, wherein said disk has servo patterns formed thereon for detection and control of the position of said head means, and wherein said servo patterns are not formed by magnetic recording.

16. A disk unit according to claim 1, wherein said disk has a magnetic film for vertical magnetic recording.

17. A disk unit according to claim 1, wherein said disk has a RAM area for reading and writing information by said head means, and a ROM area only for reading information by said head means.

18. A disk unit according to claim 1, wherein said first actuator means includes an ultrasonic motor.

19. A disk unit according to claim 1, wherein said second actuator means includes an ultrasonic motor.

20. A disk unit according to claim 1, wherein said first actuator means includes a voice coil motor.

21. A disk unit according to claim 1, wherein said first actuator means includes a brushless motor.

22. A disk unit according to claim 1, wherein said second actuator means includes a brushless motor.

23. A disk unit according to claim 1, wherein said first actuator means includes means for swinging said head means.

24. A disk unit according to claim 1, wherein said first actuator means includes means for moving said head means linearly.

25. A disk unit according to claim 1, wherein said first actuator means has a plurality of drive motors.

26. A disk unit according to claim 1, wherein said first actuator means includes a stator fixed to said housing means and a moving portion movable by an interaction with said stator.

27. A disk unit according to claim 26, wherein said first actuator means further includes an arm connected at one end to said moving portion and a slider, provided at the other end of said arm, for supporting said head means while sliding over said disk.

28. A disk unit according to claim 27, wherein said head means is provided at a side face of said slider.

29. A disk unit according to claim 27, said moving portion and said arm are formed of an one-piece member.

30. A disk unit according to claim 26, wherein said stator has a circumferential surface and produces a progressive wave in the circumferential direction on said circumferential surface, wherein said moving portion includes a rotary member having a hole to fit said circumferential surface and being rotatable along said circumferential surface by said progressive wave, and wherein said stator and said moving portion constitute an ultrasonic motor.

31. A disk unit according to claim 26, wherein said stator has a flat surface of an annular shape and a progressive wave is produced in the direction in which the wave turns around along the center position of the flat surface of annular shape, wherein said moving portion includes a turning member which is in contact with said flat surface of annular shape and turns by being urged by said progressive wave, and wherein said stator and said moving portion constitute an ultrasonic motor.

32. A disk unit according to claim 26, wherein said stator has a stator portion as a member of a brushless motor, wherein said moving portion has a rotor portion as a member of said brushless motor, wherein said rotor portion is adapted to be connected to support means mounted outside said housing means and is rotatably supported by said support means when said rotor is connected to said support means.

33. A disk unit according to claim 26, wherein said stator has a stator portion as a member of a voice coil motor, wherein said moving portion has a swinging portion as a member of said voice coil motor, and wherein said swinging portion is adapted to be connected to a support means mounted outside said housing means and is rotatably supported by said support means when said swinging portion is connected to said support means.

34. A disk unit according to claim 1, wherein said first actuator means includes a stator fixed to said housing means, a rotor rotatable by an interaction with said stator, an arm connected at one end to said moving portion, and a slider, provided at the other end of said arm, for supporting said head means while sliding over said disk.

35. A disk unit according to claim 34, wherein said arm has a hole of a substantially parallelogramatic shape, wherein said arm in a region around a hole thereof is formed in a shape determined so as to be subject to distortion such that a portion of said arm extending from said hole toward said slider moves relative to a portion of said arm extending from said hole toward said moving portion by an elastic deformation of the surrounding area of said hole of said arm when a driving force to expand said hole in the diagonal line of said parallelogramatical shape thereof is applied to said arm; and wherein said first actuator means includes means for applying said driving force to said arm.

36. A disk unit according to claim 1, wherein said first actuator means includes a stator fixed to said housing means, a moving portion movable linearly by an interaction with said stator, an arm connected at one end to said moving portion, and a slider, provided at the other end, for supporting said head means while sliding over said disk.

37. A disk unit according to claim 36, wherein said first actuator means includes a support member, connected integrally with said housing portion, for supporting said moving portion, said moving portion being capable of such an elastic deformation as to move said moving portion linearly, and guide means for guiding said moving portion so as to move linearly.

38. A disk unit according to claim 36, wherein said arm has an elastic deformation portion, wherein said elastic deformation portion capable of elastic deformation such that a portion of said arm located on the slider side, that is, opposite the side of said elastic deformation portion moves in the moving direction of said moving portion relative to a portion of the arm located on the side of said elastic deformation portion and adjacent to said moving portion, and wherein said first actuator means further includes means for applying a driving force to said arm so as to subject said elastic deformation portion to said elastic deformation.

39. A disk unit according to claim 1, wherein said stator has a circumferential surface and produces a progressive wave traveling in the circumferential direction on said circumferential surface, wherein said moving portion includes a rotating member having a hole to fit in with said circumferential surface and turns around on said circumferential surface by said progressive wave, and wherein said stator and said moving portion constitute an ultrasonic motor.

40. A disk unit according to claim 1, wherein said stator has a flat surface of an annular shape and produces a progressive wave turning around along the center of the annular shape on said flat surface, wherein said moving portion has a rotating member in contact with said flat surface of said annular shape and turning around by said progressive wave, and wherein said stator and said moving portion constitute an ultrasonic motor.

41. A disk unit according to claim 1, wherein said stator has a stator portion as a member of a brushless motor, wherein said moving portion has a rotor portion as a member of said brushless motor, wherein said rotor portion is adapted to be connected to a support member outside said housing means and is rotatably supported by said support means when said rotor portion is connected to said support means.

42. A disk unit according to claim 1, wherein said moving portion of said second actuator means is a rotor movable with respect to said stator.

43. A disk unit according to claim 2, wherein said first actuator means and said second actuator means respectively have a thickness approximately in a range of 3.5 mm.

44. A disk unit according to claim 1, wherein said first actuator means includes first driven means, adapted to be connected operatively to first driving means, for moving said head means relative to said disk by being driven by said first driving means when connected to said first driving means, and said second actuator means includes second driven means, adapted to be connected operatively to said second driving means, for rotating said disk by being driven by said second driving means when connected to said second driving means.

45. A disk unit according to claim 44, wherein said housing means houses said first driven means of said first actuator means and said second driven means of said second actuator means, said first driving means and said second driving means being provided exteriorly of said housing means.

46. A disk unit according to claim 1, wherein said first actuator means has no bearing structure.

47. A disk unit according to claim 1, wherein said first actuator means includes a stator and a moving portion movable with respect to said stator, said stator and said moving portion having no bearing structure therebetween.

48. A disk unit according to claim 1, wherein said first actuator means and said second actuator means respectively have a thickness of 3.5 mm.

49. A disk unit comprising:

a recording medium disk;

head means for reading and writing information on said disk;

first driven means, adapted to be connected operatively to first driving means, for moving said head means relative to said disk by being driven by said first driving means when connected to said first driving means;

second driven means, adapted to be connected operatively to second driving means, for rotating said disk by being driven by said second driving means when connected to said second driving means; and housing means for housing said disk, said head means, said first driven means and said second driven means;

wherein said first driving means and said second driving means are provided at the outside of said housing means, and wherein said first driven means and said second, driven means each have no bearing structure.

50. A disk unit according to claim 49, wherein said disk has a diameter approximately in a range of 51 mm.

51. A disk unit according to claim 49, wherein said first driven means and said second driven means each have a thickness approximately in a range of 5 mm.

52. A disk unit according to claim 49, wherein said housing means has external dimensions, including a length approximately in a range of 55 mm, a width approximately in a range of 86 mm, and a thickness approximately in a range of 3.5 mm.

53. A disk unit according to claim 49, further comprising connector means, provided on the side face of said housing means, for electrical connection to transmit information to and from said head means.

54. A disk unit according to claim 53, wherein said housing means and said connector means each have combined external dimensions of thickness approximately in a range of 3.5 mm.

55. A disk unit according to claim 53, wherein said housing means and said connector means have combined external dimensions, including a length approximately in a range of 55 mm, a width approximately in a range of 86 mm, and a thickness approximately in a range of 5.5 mm.

56. A disk unit according to claim 49, wherein at least a part of said circuit for processing information is included in said housing means.

57. A disk unit according to claim 49, wherein said head means includes a recording-reproduction-separated type head having a recording portion for writing information on said disk and a reproducing portion for reading information from said disk.

58. A disk unit according to claim 57, wherein said disk has servo patterns formed thereon for detection and control of the position of said head means, and wherein said reproducing portion also functions as a detector to read said servo patterns.

59. A disk unit according to claim 57, wherein said disk has servo patterns formed thereon for detection and control of the position of said head means, and wherein said head means further includes a detection head to read said servo patterns.

60. A disk unit according to claim 59, wherein said detection head includes an optical head.

61. A disk unit according to claim 49, wherein said disk includes a magnetic disk and said head means includes a magnetic head.

62. A disk unit according to claim 61, wherein said magnetic disk has servo patterns, formed thereon as changes in shape or changes in the magnetic characteristics, for detection and control of the position of said head means.

63. A disk unit according to claim 49, wherein said disk has servo patterns formed thereon for detection and control of the position of said head means, and said servo patterns are not patterns formed by magnetic recording.

64. A disk unit according to claim 49, wherein said disk has a magnetic film for vertical magnetic recording.

65. A disk unit according to claim 49, wherein said disk has a RAM area for reading and writing information by said head means, and a ROM area only for reading information by said head means.

66. A disk unit according to claim 49, wherein said first driven means has a shaft member rotatably supported by said housing member; and wherein said shaft member is adapted to be connected operatively to said first driving means, and rotates by being driven by said first driving means when connected to said first driving means.

67. A disk unit according to claim 66, wherein said first driven means further includes an arm connected at one end to said shaft member, and a slider, provided at the other end of said arm, for supporting said head means while sliding over said disk.

68. A disk unit according to claim 67, wherein said head means is provided on a side face of said slider.

69. A disk unit according to claim 67, wherein said arm has a hole of a substantially parallelogramatic shape, wherein said arm in a region around a hole thereof is formed in a shape determined so as to be subject to distortion such that a portion of said arm extending from said hole toward said slider moves relative to a portion of said arm extending from said hole toward said moving portion by an elastic deformation of the surrounding area of said hole of said arm when a driving force to expand said hole in the diagonal like of said parallelogramatical shape thereof is applied to said arm; and wherein said first actuator means includes means for applying said driving force to said arm.

70. A disk unit according to claim 49, wherein said second driven means has a shaft member rotatably supported by said housing member, wherein said shaft member is adapted to be connected operatively to said second driving means, and rotates by being driven by said second driving means when connected to said second driving means.

71. A disk unit according to claim 49, wherein said first driven means and said second driven means each have a thickness approximately in a range of 3.5 mm.

72. A disk unit according to claim 49, wherein said housing means has external dimensions of thickness approximately in a range of 3.5 mm.

73. A disk unit according to claim 49, wherein said first driven means and said second driven means each have a thickness of 3.5 mm.

* * * * *